(12) United States Patent
Madon et al.

(10) Patent No.: US 10,906,497 B2
(45) Date of Patent: Feb. 2, 2021

(54) AIRBAG WITH DEPLOYMENT CONTROLLING FLAP

(71) Applicant: TRW Vehicle Safety Systems Inc., Washington, MI (US)

(72) Inventors: Bezan P. Madon, Washington, MI (US); Douglas M. Gould, Lake Orion, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 0 days.

(21) Appl. No.: 16/163,648

(22) Filed: Oct. 18, 2018

(65) Prior Publication Data

US 2020/0122673 A1    Apr. 23, 2020

(51) Int. Cl.
| | |
|---|---|
| *B60R 21/2155* | (2011.01) |
| *B60R 21/0132* | (2006.01) |
| *B60R 21/205* | (2011.01) |
| *B60R 21/203* | (2006.01) |
| *B60R 21/237* | (2006.01) |
| *B60R 21/16* | (2006.01) |
| *B60R 21/00* | (2006.01) |

(52) U.S. Cl.
CPC ...... *B60R 21/2155* (2013.01); *B60R 21/0132* (2013.01); *B60R 21/203* (2013.01); *B60R 21/205* (2013.01); *B60R 21/237* (2013.01); *B60R 2021/0048* (2013.01); *B60R 2021/161* (2013.01)

(58) Field of Classification Search
CPC . B60R 21/2155; B60R 21/237; B60R 21/203; B60R 21/205; B60R 21/0132; B60R 2021/161; B60R 2021/0048
See application file for complete search history.

(56) References Cited

U.S. PATENT DOCUMENTS

| | | |
|---|---|---|
| 5,160,164 A | 11/1992 | Fischer et al. |
| 5,348,343 A | 9/1994 | Hawthorn |
| 5,613,698 A | 3/1997 | Patercsak et al. |
| 5,636,861 A | 6/1997 | Orsulak et al. |
| 5,823,566 A * | 10/1998 | Manire ............. B60R 21/201 280/728.3 |
| 6,206,409 B1 | 3/2001 | Kato et al. |
| 6,474,686 B1 | 11/2002 | Higuchi et al. |
| 6,877,772 B2 | 4/2005 | Fischer et al. |
| 6,918,868 B2 | 7/2005 | Vitet |

(Continued)

*Primary Examiner* — Drew J Brown
(74) *Attorney, Agent, or Firm* — Tarolli, Sundheim, Covell & Tummino LLP

(57) ABSTRACT

An apparatus for helping to protect an occupant of a vehicle includes an airbag, an inflator, a first deployment flap, and fasteners. The airbag includes an upper portion and a lower portion. In a stored condition of the airbag, the lower portion is rolled and/or folded and positioned at least partially overlying the inflator, the upper portion is rolled and/or folded separately from the lower portion and positioned at least partially overlying the lower portion, and the first deployment flap extends from the fasteners and has a portion positioned between the upper and lower portions of the airbag. The first deployment flap is at least one of formed from and coated with a material that provides a frictional engagement between the first deployment flap and the lower portion sufficient to at least partially restrict and delay the initial deployment of the lower portion.

19 Claims, 18 Drawing Sheets

(56) References Cited

U.S. PATENT DOCUMENTS

Figure 1:
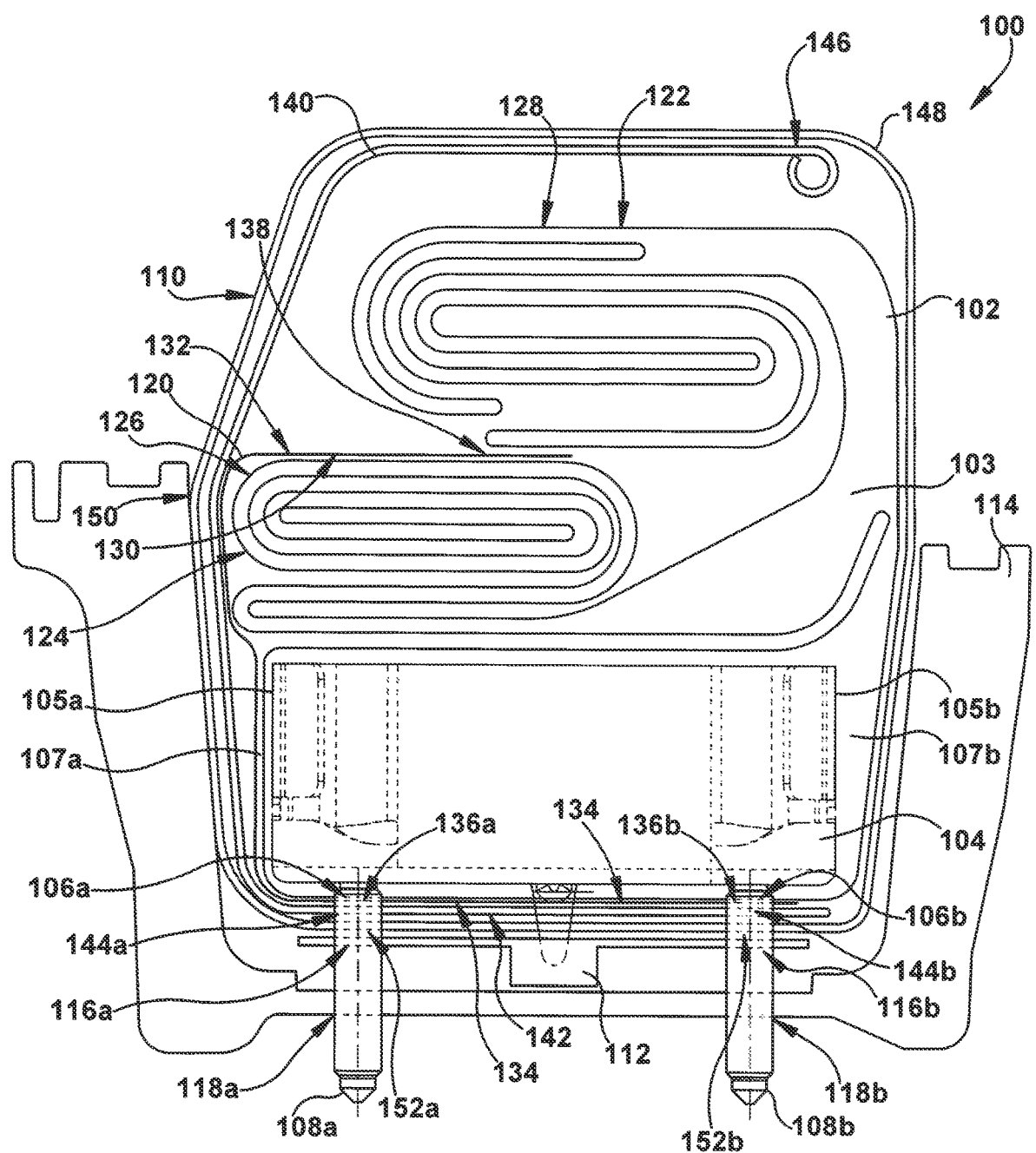

| | | |
|---|---|---|
| 6,955,377 B2 | 10/2005 | Cooper et al. |
| 7,021,653 B2 | 4/2006 | Burdock et al. |
| 7,090,248 B2 | 8/2006 | Jenkins et al. |
| 7,441,804 B2 | 10/2008 | Rose et al. |
| 7,568,730 B2 | 10/2009 | Kwon |
| 7,731,230 B2 | 6/2010 | Fischer et al. |
| 7,770,925 B2 | 8/2010 | Seymour et al. |
| 8,407,968 B2 * | 4/2013 | Lachat ............... B60R 21/201 280/743.1 |
| 8,608,195 B2 * | 12/2013 | Yamada ............... B60R 21/201 280/732 |
| 9,333,932 B2 * | 5/2016 | Sakai ............... B60R 21/205 |
| 9,623,832 B2 * | 4/2017 | Miura ............... B60R 21/201 |
| 2003/0122356 A1 * | 7/2003 | Fischer ............... B60R 21/205 280/743.1 |
| 2003/0189319 A1 | 10/2003 | Soderquist |
| 2004/0251669 A1 | 12/2004 | Fischer et al. |
| 2007/0120346 A1 * | 5/2007 | Kwon ............... B60R 21/2165 280/728.2 |
| 2007/0138779 A1 * | 6/2007 | Kwon ............... B60R 21/201 280/743.2 |
| 2008/0217887 A1 * | 9/2008 | Seymour ............... B60R 21/201 280/728.2 |
| 2009/0091111 A1 | 4/2009 | Fischer et al. |
| 2015/0115577 A1 | 4/2015 | Miura et al. |

\* cited by examiner

AIRBAG WITH DEPLOYMENT CONTROLLING FLAP

FIELD OF THE INVENTION

The present invention relates to an apparatus for helping to protect an occupant of a vehicle. More particularly, the present invention relates to an airbag inflatable between an instrument panel and a front seat of a vehicle.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle so as to position the airbag between the instrument panel and any occupants of these seats. Such airbags may be driver airbags or passenger airbags. When inflated, the driver and passenger airbags help protect the occupants from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

SUMMARY

According to one aspect, an apparatus for helping to protect an occupant of a vehicle includes an airbag having a stored condition and being inflatable to a deployed condition, an inflator operatively connected to the airbag, fasteners connecting the airbag and the inflator to the vehicle, and a first deployment flap connected to the vehicle through the fasteners. The airbag includes an upper portion and a lower portion. In the stored condition of the airbag, the lower portion is rolled and/or folded and positioned at least partially overlying the inflator, the upper portion is rolled and/or folded separately from the lower portion and positioned at least partially overlying the lower portion, and the first deployment flap extends from the fasteners and has a portion positioned between the upper and lower portions of the airbag. The first deployment flap is at least one of formed from and coated with a material that provides a frictional engagement between the first deployment flap and the lower portion sufficient to at least partially restrict and delay the initial deployment of the lower portion.

According to another aspect, alone or in combination with any other aspect, the first deployment flap can be at least partially formed from high-density polyethylene.

According to another aspect, alone or in combination with any other aspect, the first deployment flap has a first surface and a second surface. The first surface of the first deployment flap can contact at least a portion of the lower portion when the first deployment flap is positioned between the upper and lower portions. The second surface of the first deployment flap can contact at least a portion of the upper portion when the first deployment flap is positioned between the upper and lower portions.

According to another aspect, alone or in combination with any other aspect, frictional engagement between the lower portion and the first surface of the deployment flap can be greater than the frictional engagement between the upper portion and the second surface of the deployment flap.

According to another aspect, alone or in combination with any other aspect, the first deployment flap can at least partially surrounds the lower portion of the airbag when the airbag is in the stored condition so as to at least partially restrict and delay initial deployment of the lower portion.

According to another aspect, alone or in combination with any other aspect, during deployment, the upper portion can exert a force onto a least a portion of the first deployment flap to increase the degree to which the first deployment flap restricts and delays the initial deployment of the lower portion by increasing frictional engagement between the first deployment flap and the lower portion.

According to another aspect, alone or in combination with any other aspect, during deployment of the airbag, as a result of the first deployment flap restricting and delaying the initial deployment of the lower portion, the upper portion can deploy in advance of the lower portion.

According to another aspect, alone or in combination with any other aspect, the restriction and delay of the initial deployment of the lower portion while the upper portion deploys can cause the upper portion to be deployed at about a 45 degree angle from a vehicle floor.

According to another aspect, alone or in combination with any other aspect, the first deployment flap can have a first end portion attached to the fasteners and a second end portion positioned between the upper and lower portions of the airbag when the airbag is in the stored condition.

According to another aspect, alone or in combination with any other aspect, the apparatus can further include a second deployment flap that at least partially surrounds the upper and lower portions of the airbag when the airbag is in the stored condition.

According to another aspect, alone or in combination with any other aspect, the second deployment flap has a first end and a second end. The first end of the second deployment flap can be attached to the fasteners. At least a portion of the second deployment flap adjacent to the second end can be positioned on the upper portion of the airbag when the airbag is in the stored condition.

According to another aspect, alone or in combination with any other aspect, the apparatus can further include a housing and the inflator. The airbag, the first deployment flap, and the inflator can be supported in the housing. The inflator can be operatively connected to the airbag.

According to another aspect, alone or in combination with any other aspect, the airbag can be a passenger frontal airbag.

According to another aspect, alone or in combination with any other aspect, an airbag module can include the apparatus.

According to another aspect, alone or in combination with any other aspect, a vehicle safety system can include the airbag module.

According to another aspect, a method for folding an airbag for helping to protect an occupant of a vehicle can include providing fasteners. The airbag can be coupled to the fasteners. The airbag can be flatly spread. First and second lateral portions of the airbag can be folded inward toward a central longitudinal axis of the airbag. With the lateral portions folded, the lower portion of the airbag can be rolled downward to form a rolled lower portion of the airbag. A first deployment flap can be provided. The first deployment flap can be coupled to the fasteners. The first deployment flap can be positioned on the rolled lower portion of the airbag. The upper portion of the airbag can be rolled downward to form a rolled upper portion of the airbag. The rolled upper portion can be disposed overlying the rolled lower portion and at least a portion of the first deployment flap. The first deployment flap can be positioned between the rolled upper and lower portions.

According to another aspect, alone or in combination with any other aspect, rolling the lower portion of the airbag comprises folding the lower portion of the airbag upward onto an upper portion of the airbag and rolling the upward folded lower portion to form the rolled lower portion of the airbag. Rolling the upper portion of the airbag comprises folding a portion of the upper portion of the airbag downward onto itself and rolling the downward folded upper portion of the airbag downward to form the rolled upper portion of the airbag.

According to another aspect, alone or in combination with any other aspect, with the rolled upper portion disposed overlying the rolled lower portion and at least a portion of the first deployment flap, a first end of a second deployment flap can be attached to the fasteners so that a second end of the second deployment flap extends downward from the fasteners. The second deployment flap can be rolled upward toward the fasteners. At least a portion of the rolled second deployment flap can be disposed on the rolled upper portion of the airbag, such that the second deployment flap at least partially surrounds the rolled upper and lower portions of the airbag.

According to another aspect, alone or in combination with any other aspect, a cover wrap can be placed around the airbag, the first deployment flap, and the second deployment flap to at least partially contain the airbag, the first deployment flap, and the second deployment flap in a stored condition. The cover wrap can have at least one tear line.

According to another aspect, alone or in combination with any other aspect, the first deployment flap can be at least one of formed from and coated with a material that provides a frictional engagement between the first deployment flap and the rolled lower portion when the first deployment flap is positioned on the rolled lower portion of the airbag.

DRAWINGS

Figure 2A:
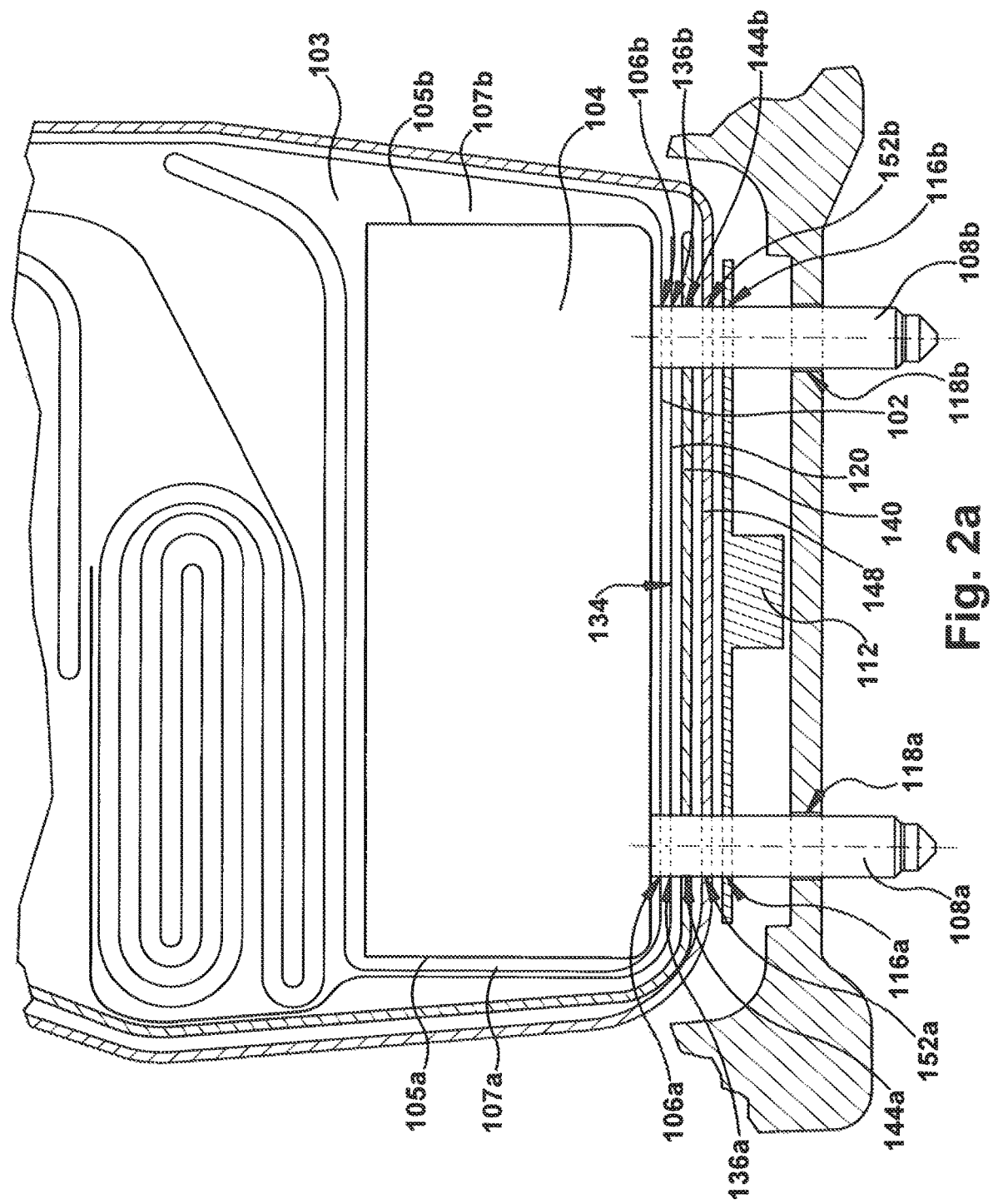
Figure 2B:
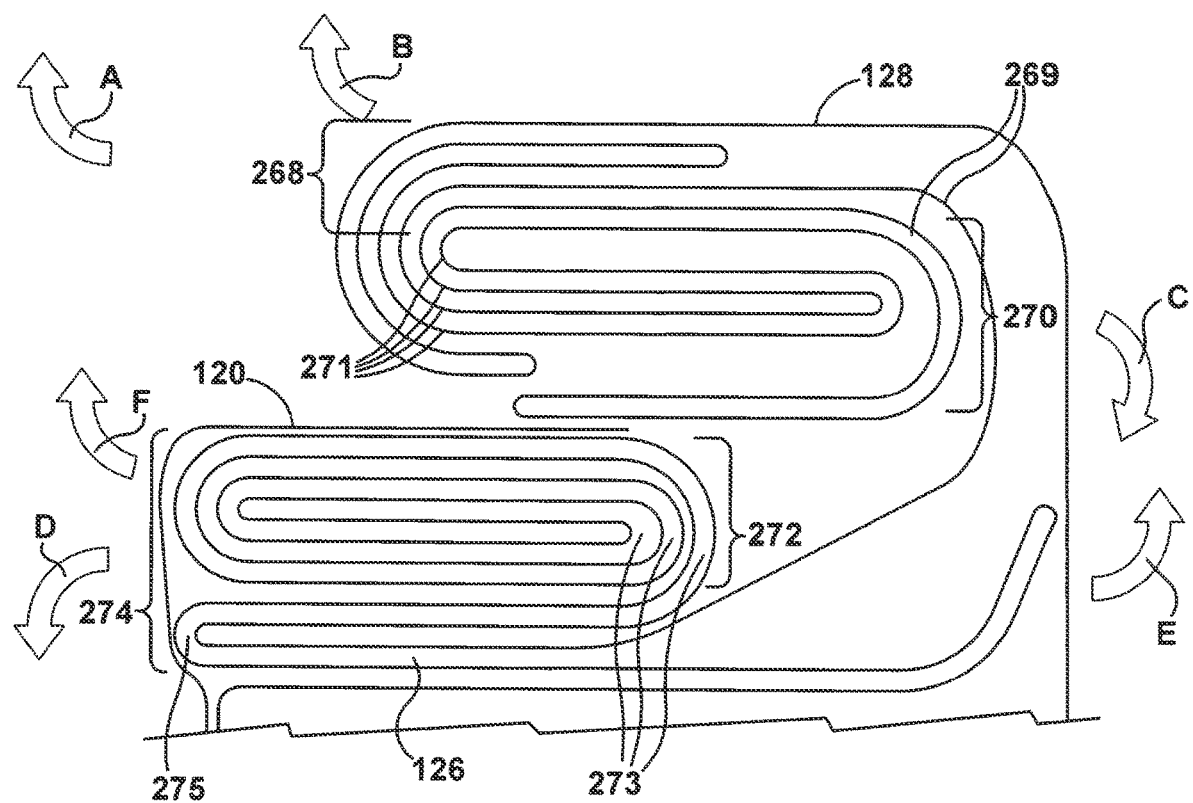
Figure 4:
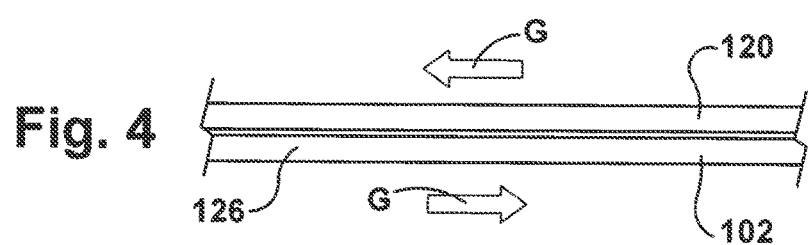
Figure 3A:
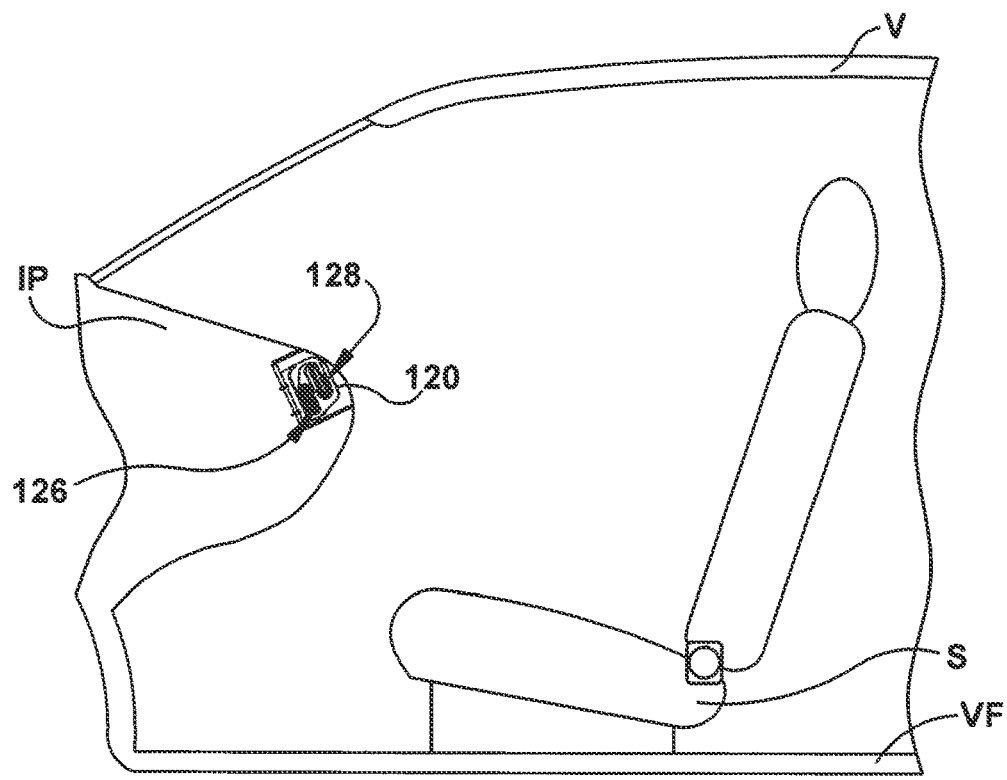

The foregoing and other features of the present invention will become apparent to one skilled in the art to which the present invention relates upon consideration of the following description of the invention with reference to the accompanying drawings, in which:

FIG. 1 is a sectional view of an apparatus for helping to protect an occupant of a vehicle;

FIGS. 2a-b are sectional views of portions of the apparatus of FIG. 1;

FIG. 3a-4 illustrates an example sequence of deployment of the apparatus of FIG. 1, in an example use environment; and FIGS. 5-18 illustrate the placement of a portion of the apparatus of FIG. 1 in a deflated and stored condition.

DETAILED DESCRIPTION

An apparatus 100 for helping to protect an occupant of a vehicle V includes an inflatable vehicle occupant protection device 102 in the form of an airbag. In the example configuration of FIGS. 1-3d, the airbag 102 can be a passenger frontal airbag for helping to protect an occupant of a vehicle seat S on a passenger side of the vehicle V, as will be discussed in more detail below. In the example configuration illustrated in FIG. 1, the airbag 102 can be coupled to and at least partially supported on a retainer 104, an inflator 112, or both. As shown in FIGS. 1-2a, at least a portion of the airbag 102 can have apertures 106 (shown here as apertures 106a and 106b) for receiving fasteners 108 (shown here as 108a and 108b), such as bolts or studs, for connecting the airbag 102 to the vehicle V. The fasteners 108a, 108b can be a part of the retainer 104 or the inflator 112. In the case of the fasteners 108a, 108b being a part of the inflator 112, the inflator 112 can be supported on the retainer 104 while the fasteners 108a, 108b extend through the retainer 104. Alternatively, the retainer 104 can be omitted from the apparatus 100 when the fasteners 108a, 108b are a part of the inflator 112. In the example configuration of FIGS. 1-2a, when the airbag 102 is coupled to the retainer 104, the retainer 104 can be positioned in an interior 103 of the airbag 102 so that the fasteners 108a, 108b extend out from the interior 103 of the airbag 102 through the apertures 106a, 106b. Further, when the airbag 102 is coupled to the retainer 104, opposing side walls 105 (shown here as side walls 105a and 105b) of the retainer 104 can be at least partially surrounded by opposing interior portions 107 (shown here as interior portions 107a and 107b) of the airbag 102.

The airbag 102 and the retainer 104, when the retainer 104 is provided, can be part of an airbag module 110 that includes the inflator 112 and a housing 114. The airbag 102 has a stored condition, as shown in FIG. 1, in which the airbag 102 is folded and placed in the housing 114. At least one of the inflator 112, when the fasteners 108a, 108b are a part of the retainer 104, and the housing 114 can have apertures 116, 118 (shown here as apertures 116a, 116b, 118a and 118b) that align with the apertures 106a, 106b in the airbag 102 and thus can receive the fasteners 108a, 108b that connect the airbag 102 to the vehicle V, such as through the retainer 104, as shown in FIGS. 1-2a. The airbag module 110 can be mounted to a dash or instrument panel IP of the vehicle V (FIG. 3a). The housing 114 can help support and contain the airbag 102, the retainer 104, and the inflator 112 in the instrument panel IP.

Figure 3B:
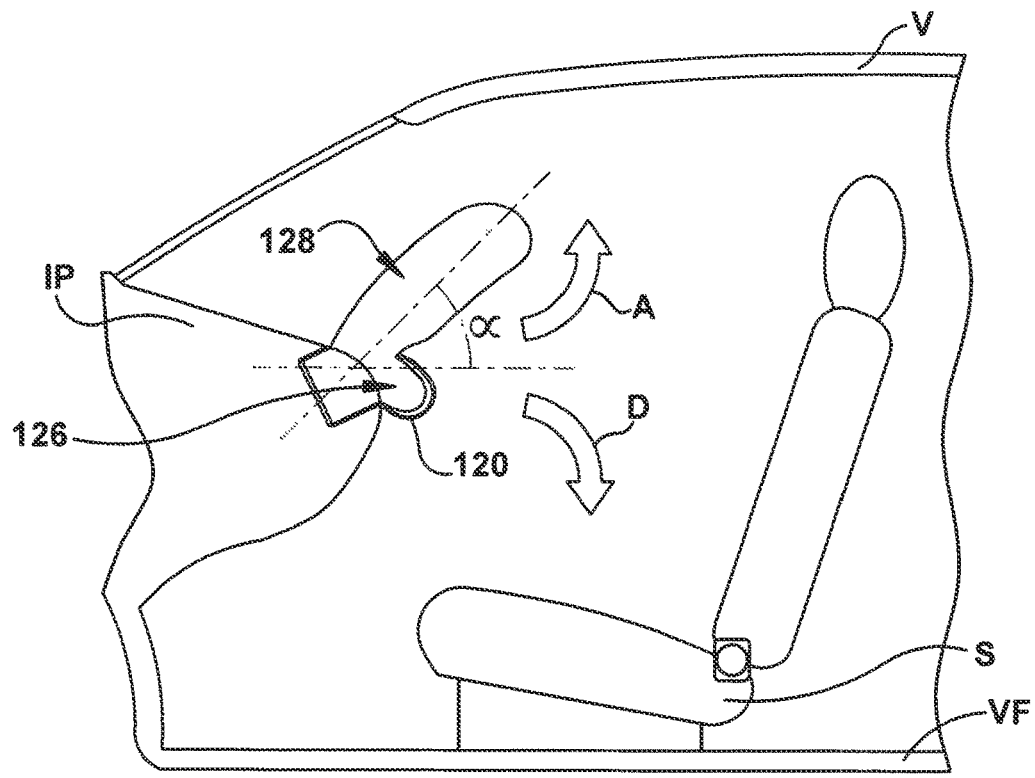
Figure 3C:
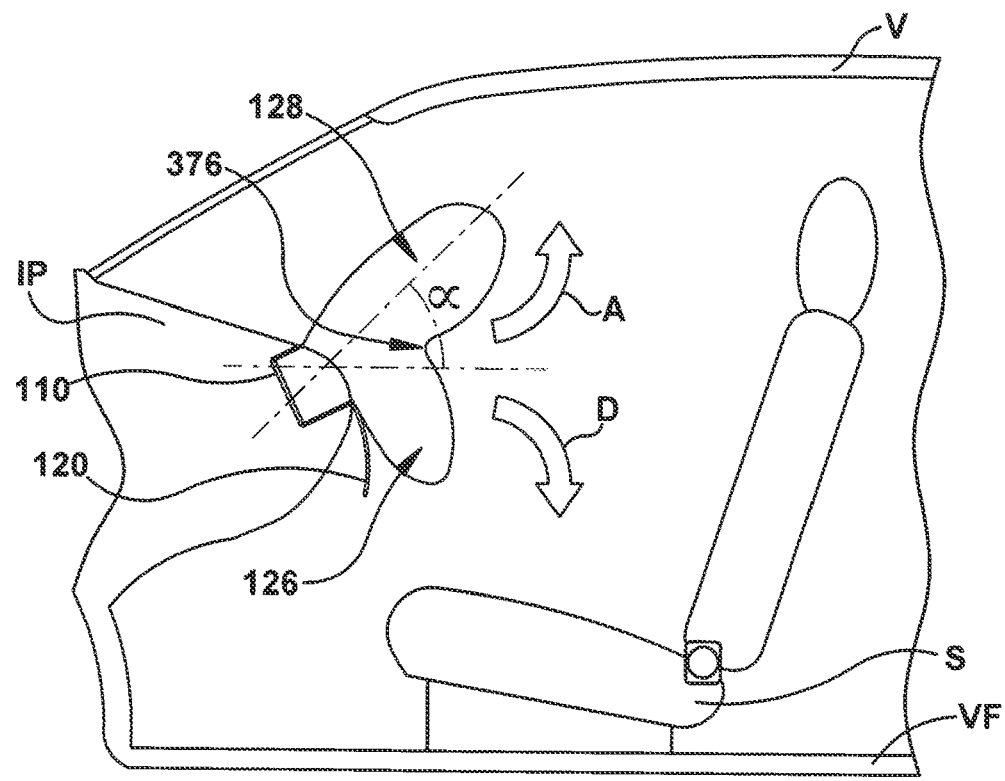
Figure 3D:
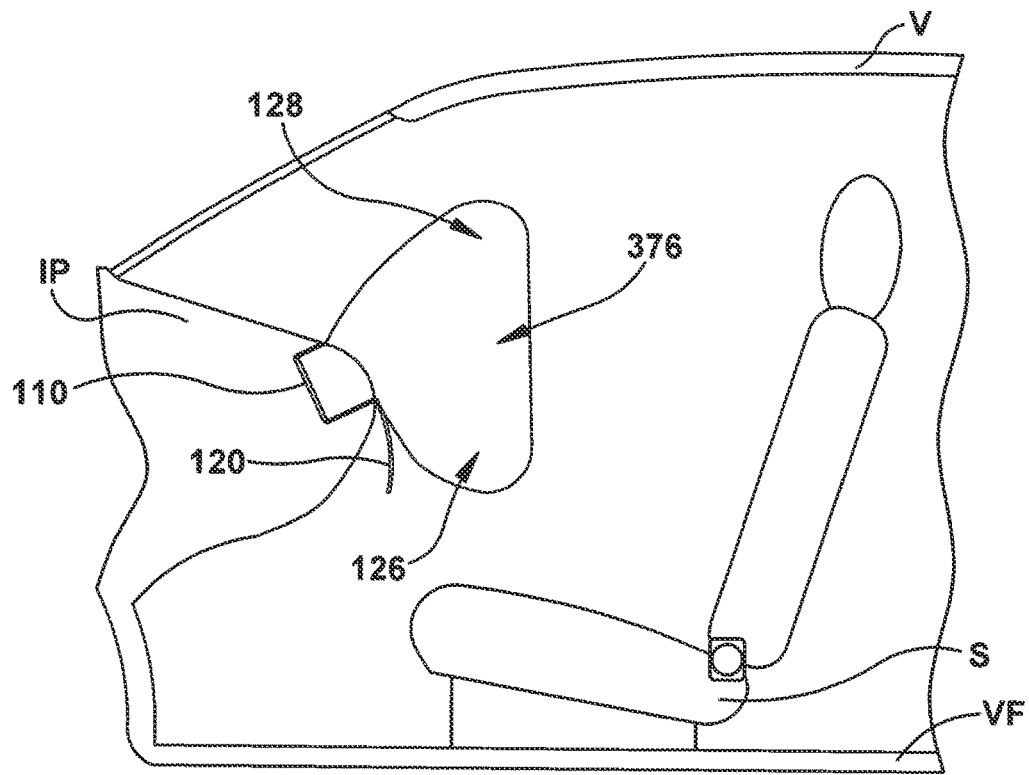

The inflator 112 is operatively connected to the airbag 102 and is actuatable to provide inflation fluid for inflating the airbag 102 to a deployed condition, which can be seen in FIG. 3d. Those skilled in the art will appreciate that the desired deployed condition of the airbag 102 may vary among different vehicle models, depending on factors such as available space in the passenger compartment and the architecture of the vehicle. The inflator 112 may be of any known type, such as stored gas, solid propellant, augmented, or hybrid. The apparatus 100 can include a sensor for sensing an event for which inflation of the airbag 102 is desired, such as a collision. The inflator 102 can be operatively connected to the sensor via lead wires.

The airbag 102 can be constructed of any suitable material, such as nylon (e.g., woven nylon 6-6 yarns), and can be constructed in any suitable manner. For example, the airbag 102 can include one or more pieces or panels of material that are interconnected by known means, such as stitching, ultrasonic welding, heat bonding, or adhesives, to form the airbag 102. Alternatively, the airbag 102 could have a one piece woven construction in which the airbag 102 is woven as a single piece of material. Also, the airbag 102 can be uncoated, coated with a material, such as a gas impermeable urethane, or laminated with a material, such as a gas impermeable film. The airbag 102 thus can have a gas-tight or substantially gas-tight construction. Those skilled in the art will appreciate that alternative materials, such as polyester yarn, and alternatives coatings, such as silicone, can also be used to construct the airbag 102.

As shown in FIG. 1, the apparatus 100 includes a first deployment flap 120 for helping to control deployment of the airbag 102. The first deployment flap 120 can be positioned between upper and lower portions 128, 126 of the airbag 102, which can be folded and/or rolled, as shown, when the airbag 102 is in the stored condition. In particular, in the example configuration of FIG. 1, when the airbag 102 is in the stored condition, the lower portion 126 of the airbag 102 is rolled/folded at least partially into a rolled lower portion 124 and positioned at least partially overlying the retainer 104, the fasteners 108a, 108b, and/or the inflator 112. The upper portion 128 of the airbag 102 is rolled/folded at least partially into a rolled upper portion 122 and positioned at least partially overlying the rolled lower portion 124. The first deployment flap 120 is positioned between the rolled upper and lower portions 122, 124 of the airbag 102. A first surface 130 of the first deployment flap 120 contacts at least a portion of the rolled lower portion 124 and a second surface 132 of the first deployment flap 120, opposite the first surface 130, can contact at least a portion of the rolled upper portion 122 when the first deployment flap 120 is positioned between the rolled upper and lower portions 122, 124.

The first deployment flap 120 is secured/connected to the vehicle V and/or a structure in the vehicle V, such as the airbag module 110. The first deployment flap 120 can, for example, be secured to the vehicle V via the fasteners 108a, 108b that also secure the airbag 102 to the vehicle V. As shown in the example configuration of FIGS. 1-2a, the first deployment flap 120 has a first end 134 that includes one or more apertures 136 (shown here as apertures 136a and 136b) that align with the apertures 106a, 106b in the airbag 102 and thus receive the fasteners 108a, 108b that connect the airbag 102 and the first deployment flap 120 to the vehicle V. Although, as shown in the example configuration of FIG. 1, the first deployment flap 120 is secured to the retainer 104, the first deployment flap 120 can be secured to the retainer 104, the inflator 112, or both through the fasteners 108a, 108b.

The first deployment flap 120 has a second end 138 opposite the first end 134. The first deployment flap 120 extends from the retainer 104, the inflator 112, and/or the fasteners 108a, 108b so that at least a portion of the first deployment flap 120 adjacent to the second end 138 can be positioned between rolled upper and lower portions 122, 124 of the airbag 102 when the airbag 102 is in the stored condition. In this configuration, the first deployment flap 120 can at least partially surround the rolled lower portion 124 of the airbag 102 when the airbag 102 is in the stored condition.

In one example construction, the first deployment flap 120 can be formed from a material that provides a frictional engagement between the first deployment flap 120 and the rolled lower portion 124 of the airbag 102. In another example construction, the first deployment flap 120 can be constructed of a material, such as airbag fabric, that is coated with a material that provides a frictional engagement between the first deployment flap 120 and the rolled lower portion 124 of the airbag 102. The material that the first deployment flap 120 is formed from can be high-density polyethylene that provides the frictional engagement between the first deployment flap 120 and the rolled lower portion 124 of the airbag 102. Alternatively, the first deployment flap 120 can be constructed of a different material, such as airbag fabric, that has a layer of material, such as high-density polyethylene, applied, such as by coating or lamination, that provides the frictional engagement between the first deployment flap 120 and the rolled lower portion 124 of the airbag 102.

The frictional engagement between the first deployment flap 120 and the rolled lower portion 124 is sufficient to at least partially restrict and delay the initial deployment of the lower portion 126 while the upper portion 128 deploys unrestricted or substantially unrestricted. Although at least a portion of the second surface 132 of the first deployment flap 120 can contact at least a portion of the upper portion 128, such as a portion of the rolled upper portion 122, any frictional engagement between the upper portion 128 and the second surface 132 of the first deployment flap 120 is less than the frictional engagement between at least a portion of the lower portion 126, such as a portion of the rolled lower portion 124, and the first surface 130 of the first deployment flap 120 so that the initial deployment of the lower portion 126 is restricted and delayed while the upper portion 128 deploys unrestricted or substantially unrestricted.

As shown in FIGS. 1, 2b-3a, prior to inflation and during the initial inflation and deployment of the airbag 102, the first deployment flap 120 at least partially surrounds or encircles the lower portion 126 of the airbag 102 so as to at least partially restrict and delay the initial deployment of the lower portion 126, while the upper portion 128 deploys. The particular folding and rolling of the airbag 102 of the example configuration shown in FIGS. 1, 2b causes the general deployment of the upper portion 128 of the airbag 102 to follow a trajectory/direction as shown as an arrow "A" in FIGS. 2b, 3b. In particular, as shown in the example configuration of FIG. 2b, a first folded portion 268 of the upper portion 128 tends to unfurl/deploy initially in a direction as indicated by an arrow "B" in FIG. 2b due to initial unfolding about the folds 269. A second folded portion 270 of the upper portion 128, which engages the first deployment flap 120, unfurls/deploys initially in a direction as indicated by an arrow "C" in FIG. 2b due to initial unfolding about the folds 271. The combined motions in the directions of the arrows B and C of the first and second folded portions 268, 270 produce the deployment of the upper portion 128 of the airbag 102 in the trajectory/direction of the arrow A.

In the example configuration of FIGS. 1, 2b, the particular folding and rolling of the airbag 102 causes the general deployment of the lower portion 126 of the airbag 102 to follow a trajectory/direction as shown as an arrow "D" in FIGS. 2b, 3c. However, the lower portion 126 is folded and rolled in such a manner that a portion of the lower portion 126 is urged to unfurl, i.e., deploy, into and/or against the first deployment flap 120 as the airbag 102 initially inflates and deploys. In particular, a first folded portion 272 of the lower portion 126 tends to unfurl/deploy initially in a direction as indicated by an arrow "E" in FIG. 2b due to initial unfolding about the fold 273. A second folded portion 274 of the lower portion 126, which includes the first portion 272, tends to unfurl/deploy initially in a direction as indicated by an arrow "F" in FIG. 2b due to initial unfolding about the fold 275. The first deployment flap 120 is impinged between the upper and lower portions 128, 126 of the airbag 102 because of the initial unfurling/deployment of the second portions 270, 274 of the upper and lower portions 128, 126 being toward one another and toward the first deployment flap 120. The unfurling/deployment of the lower portion 126 in the direction of the arrows E and F maintains the contact between the airbag 102 and the first deployment flap 120. This results in the lower portion 126 being urged to unfurl/deploy into and/or against the first deployment flap 120.

As shown in FIG. 3b, the frictional engagement between the first deployment flap 120 and the lower portion 126 at least partially restricts, impedes and/or inhibits the lower portion 126 from unfurling/deploying while the upper portion 128 deploys unimpeded. The deployment flap 120 thus at least partially restricts and delays the initial deployment of the lower portion 126. In particular, because the first deployment flap 120 provides a frictional engagement with at least a portion of the lower portion 126, the unfurling/deployment of the lower portion 126 in the directions indicated at the arrows E and F (see FIG. 2b) is restricted, impeded and/or inhibited. This causes the general inhibition or delay in deployment of the lower portion 126 in the direction of arrow D.

Due to the frictional properties of the engaging materials, movement of the lower portion 126 relative to the first deployment flap 120 (arrow F) results in surface shear, as indicated at arrows "G" in FIG. 4. The surface shear G resulting from the frictional engagement at least partially restricts, impedes and/or inhibits the initial deployment of the lower portion 126. Further, because of the initial unfurling/deployment of the second portion 270 of the upper portion 128 is toward the first deployment flap 120, the upper portion 128 can exert a force generally downward onto at least a portion of the first deployment flap 120 to increase the force with which the first deployment flap 120 engages the lower portion 126. This, in turn, increases the degree to which the first deployment flap 120 restricts and delays the initial deployment of the lower portion 126 by increasing the frictional engagement between the first deployment flap 120 and the lower portion 126.

As shown in FIG. 3c, once the airbag 102 inflates and pressurizes to a degree at which the friction between the first deployment flap 120 and the lower portion 126 is overcome, the delay/inhibition is relieved and the lower portion 126 is permitted to inflate and deploy freely. The roll/fold of the lower portion 126 can be such that it deploys downward along the instrument panel IP and becomes positioned between the instrument panel IP and an occupant of an adjacent vehicle seat S. As this occurs, the first deployment flap 120 moves out of the way to a position extending downward along the instrument panel IP and becomes positioned between the airbag 102 and the instrument panel IP.

Testing has shown that simultaneous deployment of the upper and lower portions 128, 126 of the airbag 102 can cause the airbag 102 to deploy generally rearward in the vehicle V as a whole, toward the occupant, as opposed to individually at angles with respect to each other. It has been found, however, that as a result of implementing the first deployment flap 120 to restrict and delay the initial deployment of the lower portion 126 while leaving the upper portion 128 free or substantially free from impediment, restriction and/or inhibition from the first deployment flap 120, the upper portion 128 can be caused to deploy in advance of the lower portion 126, as shown in FIG. 3b. Because deployment of the lower portion 126 is inhibited/delayed, it occupies space through which the freely deploying upper portion 128 can deploy. This "forces" the upper portion 128 to deploy above or over the lower portion 126 in a manner at least partially dictated by its roll/fold configuration. Advantageously, the roll/fold of the upper portion 128 can be configured to produce the desired deployment trajectory. This allows, for example, the upper portion 128 to deploy in a desired trajectory/direction, such as generally upward and rearward in the vehicle V, as shown by the arrow A.

It can be desirable for the upper and/or lower portions 128, 126 to deploy at certain angles depending, for example, on the vehicle configuration or platform. For example, it can be desirable for the upper portion 128 to deploy at a 45 degree angle from a vehicle floor VF, as is shown generally in FIG. 3b at "a". Tailoring the configuration of the apparatus 100, particularly the deployment flap 120, can cause the upper portion 128 to deploy at this trajectory/direction or another different trajectory/direction. The deployment trajectory/direction depends at least in part on the degree and duration of the frictional engagement between the first deployment flap 120 and the airbag 102. It will therefore be appreciated that airbag deployment can be tailored by adjusting factors that determine the degree/duration of the frictional engagement between the lower portion 126 and the first deployment flap 120. For example, the roll/fold configuration of the stored airbag 102, the frictional properties of the material used to construct the first deployment flap 120 and/or the airbag 102, the amount of overlap of the first deployment flap 120 and the airbag 102, the degree to which the airbag 102 is heated/compressed and packaged in the airbag module 110, the construction of the instrument panel IP, the construction of the airbag module 110 and/or the housing 114, or a combination of the factors can be tailored to cause the upper portion 128 to deploy in a desired trajectory/direction.

As a result, it can be seen that the first deployment flap 120 can be implemented in a manner such that the upper portion 128 deploys upward/rearward at a desired trajectory a, e.g., 45 degrees from the vehicle floor VF, and the lower portion 126 deploys downward along the instrument panel IP, as shown in FIG. 3c. Advantageously, the upper portion 128 can be configured to deploy above a small occupant, a forward positioned occupant, an out of position (e.g., leaned forward) occupant, or an occupant having a combination of these characteristics. The lower portion 126 can deploy, as set forth above, along the instrument panel IP, which is the best scenario for the occupants. As a result, the airbag 102 avoids deploying directly into contact with the occupant, especially the head and upper torso of the occupant. Instead, the upper portion 128 deploys upward and the lower portion 126 deploys downward as described above, which deploys a portion of the airbag 102, e.g., a central portion 376, more gently toward the head/upper torso of the occupant, as shown in FIGS. 3c-3d.

Returning to FIG. 1, the apparatus 100 can include a second deployment flap 140 for helping to protect the airbag 102 as it deploys from the housing 114 and/or the instrument panel IP, as will be discussed in more detail below. The second deployment flap 140 at least partially surrounds the rolled upper and lower portions 122, 124 of the airbag 102 when the airbag 102 is in the stored condition. The second deployment flap 140 can be secured to the vehicle V and/or a structure in the vehicle V, such as the airbag module 110. The second deployment flap 140, for example, can be secured to the vehicle V via the fasteners 108a, 108b that also secure the airbag 102 and the first deployment flap 120 to the vehicle V. As shown in FIGS. 1-2a, the second deployment flap 140 can have a first end 142 that includes one or more apertures 144 (shown here as apertures 144a and 144b) that align with the apertures 106a, 106b in the airbag 102 and thus receive the fasteners 108a, 108b that connect the airbag 102, the first deployment flap 120, and the second deployment flap 140 to the vehicle V. Although, as shown in the example configuration of FIGS. 1-2a, the second deployment flap 140 is secured to the retainer 104, the second deployment flap 140 can be secured to the retainer 104, the inflator 112, or both through the fasteners 108a, 108b. The second deployment flap 140 has a second end 146 and at least a portion of the second deployment flap 140 adjacent to the second end 146 can be positioned on the rolled upper portion 122 of the airbag 102 when the airbag 102 is in the stored condition.

The second deployment flap 140 can function to reinforce the material of the airbag 102 and protect the airbag 102 from directly impacting the housing 114 and/or the instrument panel IP during the initial deployment of the airbag 102. Because the airbag 102 can be stored in at least one of the housing 114 and the instrument panel IP, the airbag 102 can have to deploy through at least one of the housing 114 and the instrument panel IP. For example, the housing 114 can have a cover and the instrument panel IP can have a tear section that the airbag 102 deploys through during deployment of the airbag 102. The tear section of the instrument panel IP provides a controlled failure location in the instrument panel IP through which a deploying airbag 102 can pass. As the airbag 102 deploys, the airbag 102 can be forced through at least one of the cover and the tear section of the instrument panel IP. Edges of the tear section and/or the cover can cause tears or rips on the fabric of conventional airbags as the airbag 102 deploys therethrough. However, the second deployment flap 140 is configured to reinforce the airbag material as the airbag 102 exits at least one of the cover and the tear section during deployment. Because the second deployment flap 140 is situated between the airbag 102 and at least one of the cover and the tear section, the interaction with any edges will occur with the second deployment flap 140 and not the airbag 102. Thus, the second deployment flap 140 can help in protecting the airbag 102 from ripping, tearing, or otherwise snagging during deployment.

The apparatus 100 can further include a cover wrap 148 that at least partially surrounds the airbag 102, the first deployment flap 120, the retainer 104, when the retainer 104 is provided, and the second deployment flap 140 when the airbag 102 is in the stored condition. The cover wrap 148 at least partially contains the airbag 102, the first deployment flap 120, the retainer 104, when the retainer 104 is provided, and the second deployment flap 140 in the stored condition. The cover wrap 148 can have at least one tear line 150 that is torn when the airbag 102 is moved from the stored condition to the deployed condition. The cover wrap 148 can be secured to the vehicle V and/or a structure in the vehicle, such as the airbag module 110. The cover wrap 148, for example, can be secured to the vehicle V via the fasteners 108a, 108b that also secure the airbag 102 to the vehicle V. The cover wrap 148 can have one or more apertures 152 (shown here as apertures 152a and 152b) that align with the apertures 106a, 106b in the airbag 102 and thus receive the fasteners 108a, 108b that connect the airbag 102, the first deployment flap 120, the second deployment flap 140, and the cover wrap 148 to the vehicle V. Although, as shown in the example configuration of FIG. 1, the cover wrap 148 is secured to the retainer 104, the cover wrap 148 can be secured to the retainer 104, the inflator 112, or both through the fasteners 108a, 108b.

FIGS. 5-18 illustrate a process by which the airbag 102 is placed in the particular example deflated and stored condition illustrated in FIGS. 1-4. The airbag 102 and the first deployment flap 120 can be coupled to the retainer 104, the inflator 112, or both through the fasteners 108a, 109b. In particular, as shown in FIG. 5a, the airbag 102 is positioned overlying the first deployment flap 120 and the fasteners 108a, 108b are passed through the aligned apertures 106a, 106b, 136a, 136b of the airbag 102 and the first deployment flap 120 to maintain the relative positioning of the airbag 102 and the first deployment flap 120. The first end 134 of the first deployment flap 120 is thus secured to the vehicle V and/or a structure in the vehicle V, such as the retainer 104, the inflator 112, the airbag module 110, or a combination thereof, via the fasteners 108a, 108b.

Figure 5:
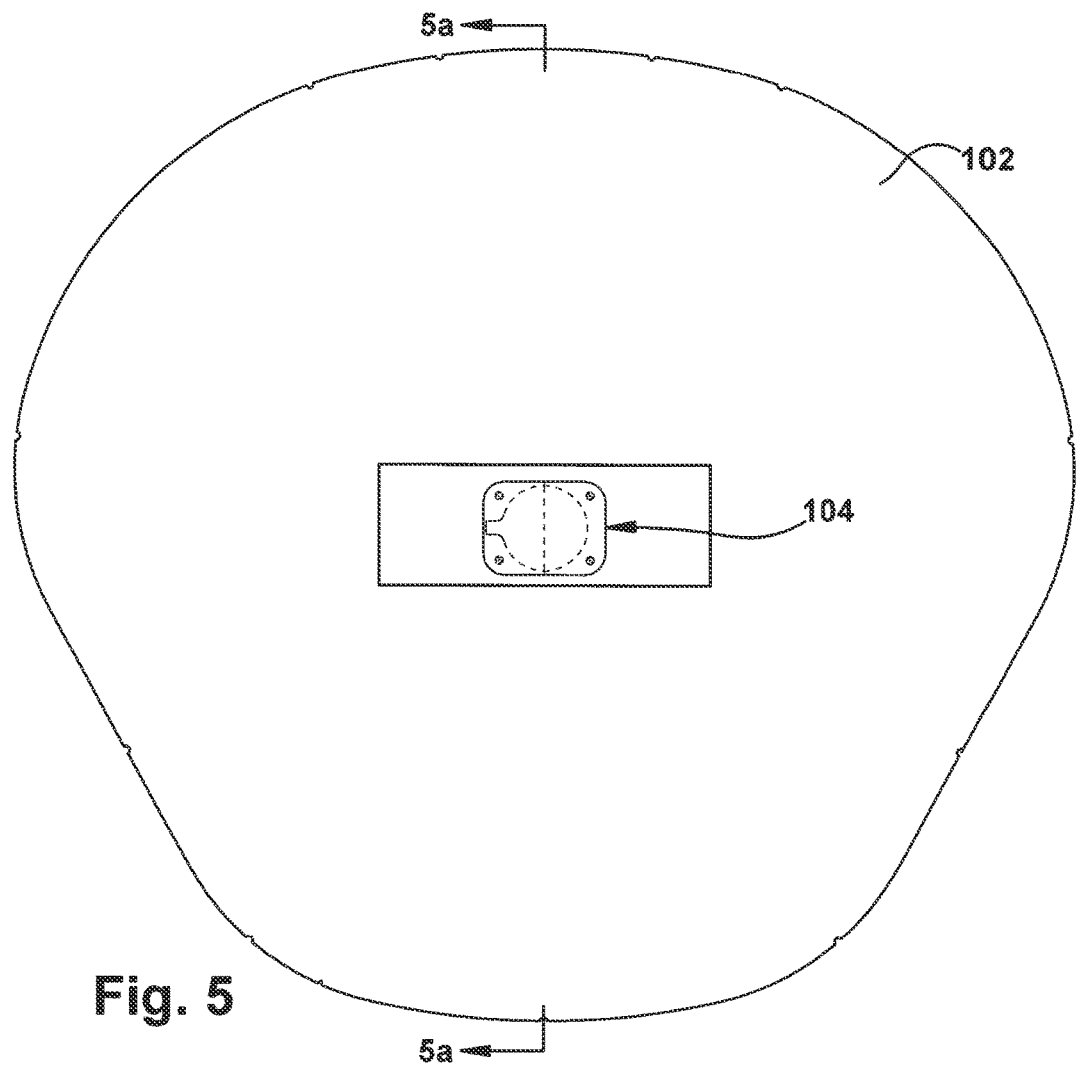
Figure 5A:
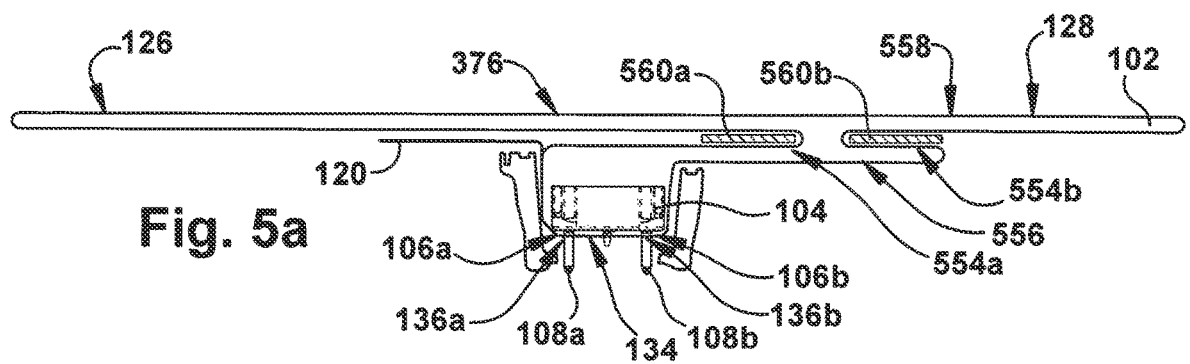

The airbag 102 is maneuvered, such as by being flatly spread, to a flattened condition as shown in FIGS. 5-5a. As shown in FIG. 5a, pleats 554 (shown here as pleats 554a and 554b) can be formed in a rear panel 556 of the airbag 102 so that a front panel 558 of the airbag 102 lies flat. Tools, such as paddles 560 (shown here as paddles 560a and 560b), can be used to help form the pleats 554a, 554b in the rear panel 556. In the flattened condition, the airbag 102 has the upper portion 128, the lower portion 126, and a central portion 376 positioned between the upper and lower portions 126, 128. The central portion 376 coincides with the retainer 104.

Figure 6:
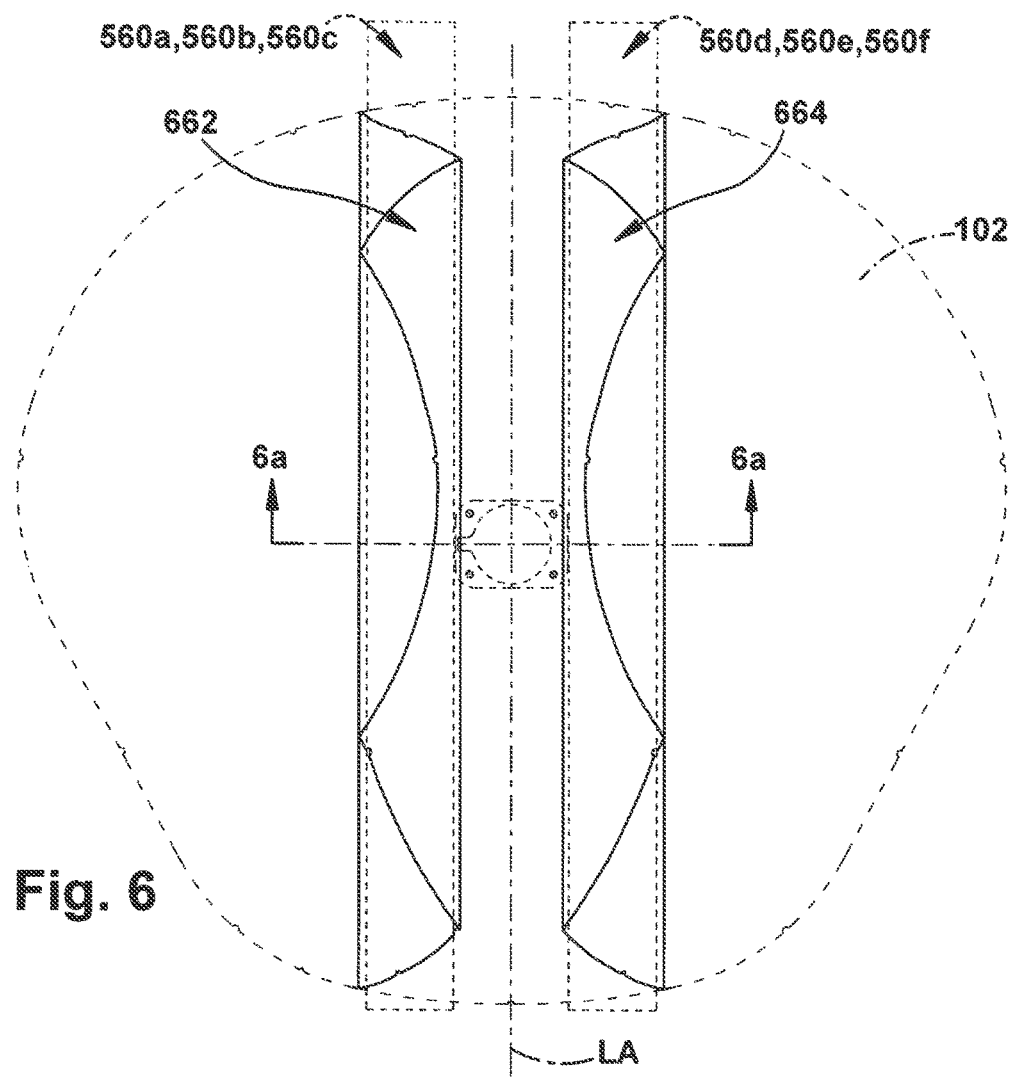
Figure 6A:
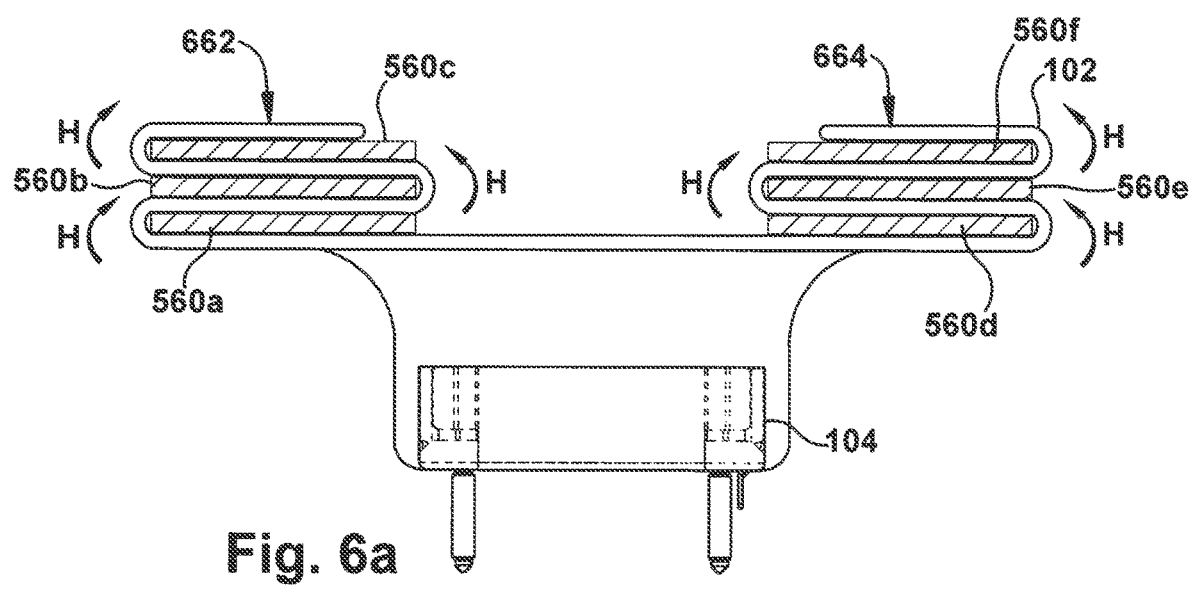
Figure 7:
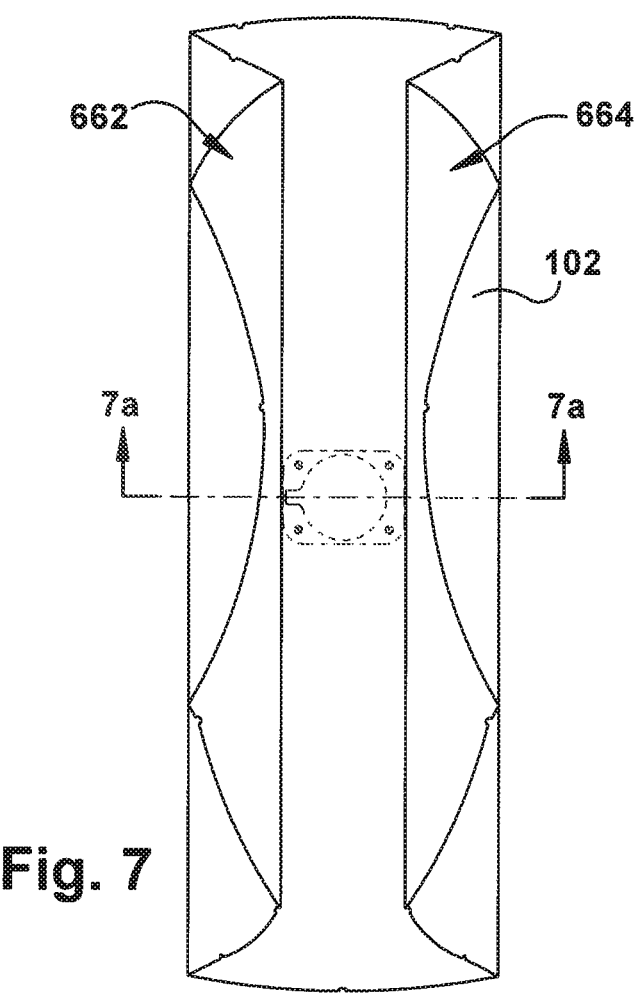
Figure 7A:
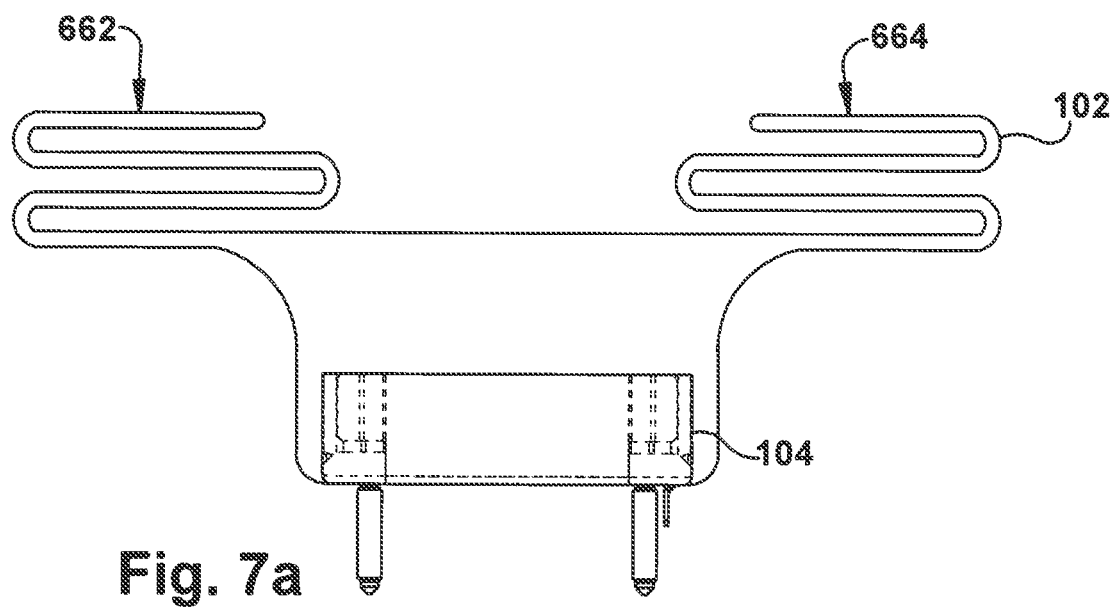

The upper portion 128 is positioned generally upward from the central portion 376 and from the retainer 104 and/or inflator 112 when the airbag 102 is in the inflated and deployed condition. The lower portion 126 is positioned generally downward from the central portion 376 and from the retainer 104 and/or inflator 112 when the airbag 102 is in the inflated and deployed condition. Referring to FIGS. 6-7a, first and second lateral portions 662, 664 of the airbag 102 are then fan-folded, i.e., folded back and forth in opposite directions as indicated by arrows identified at "H" in FIG. 6a, inward toward a central longitudinal axis LA of the airbag 102. As shown in FIGS. 6-6a, paddles 560 (shown here as paddles 560a, 560b, 560c, 560d, 560e and 560f) can be used to help fan-fold the first and second lateral portions 662, 664 of the airbag 102. As shown in FIGS. 7-7a, after the first and second lateral portions 662, 664 of the airbag 102 are fan-folded, if the paddles 560a, 560b, 560c, 560d, 560e, 560f were used, the paddles 560a, 560b, 560c, 560d, 560e, 560f can be removed.

Figure 8:
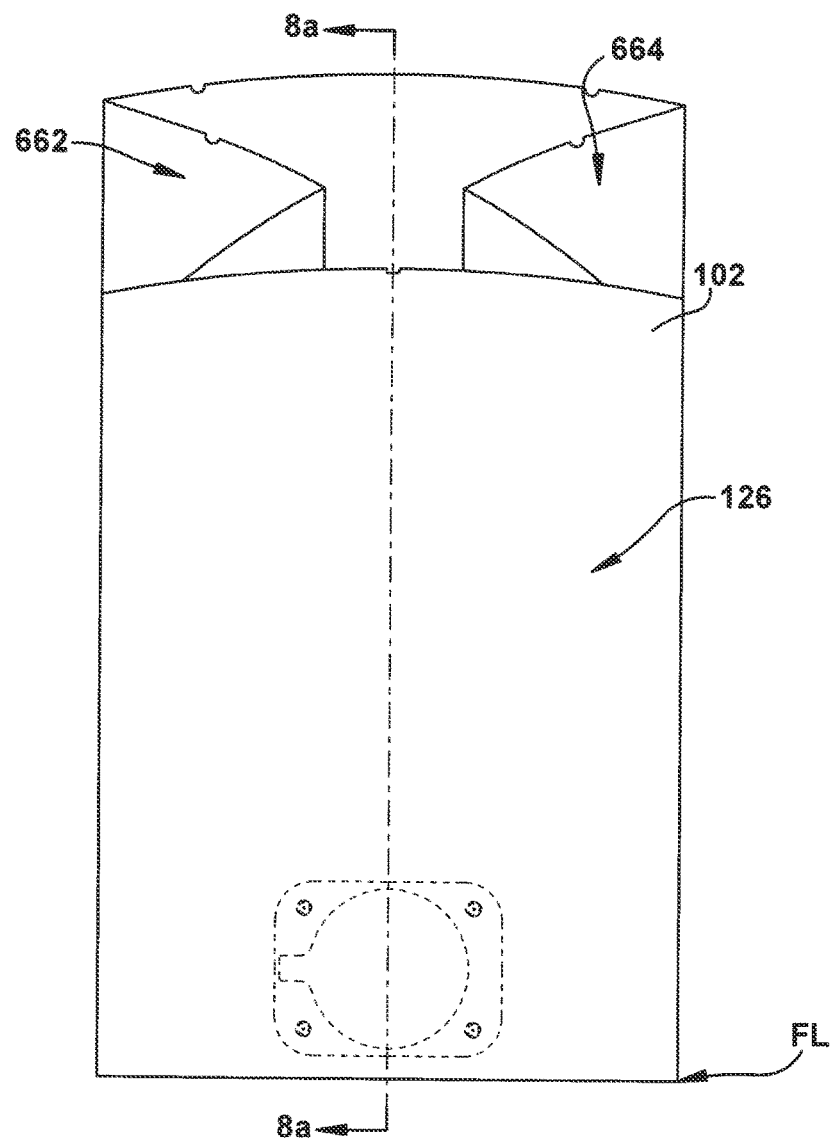
Figure 8A:
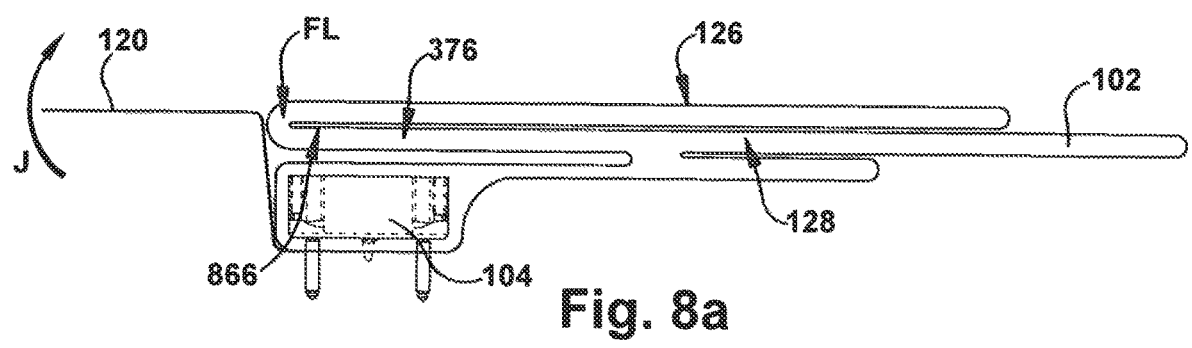
Figure 9:
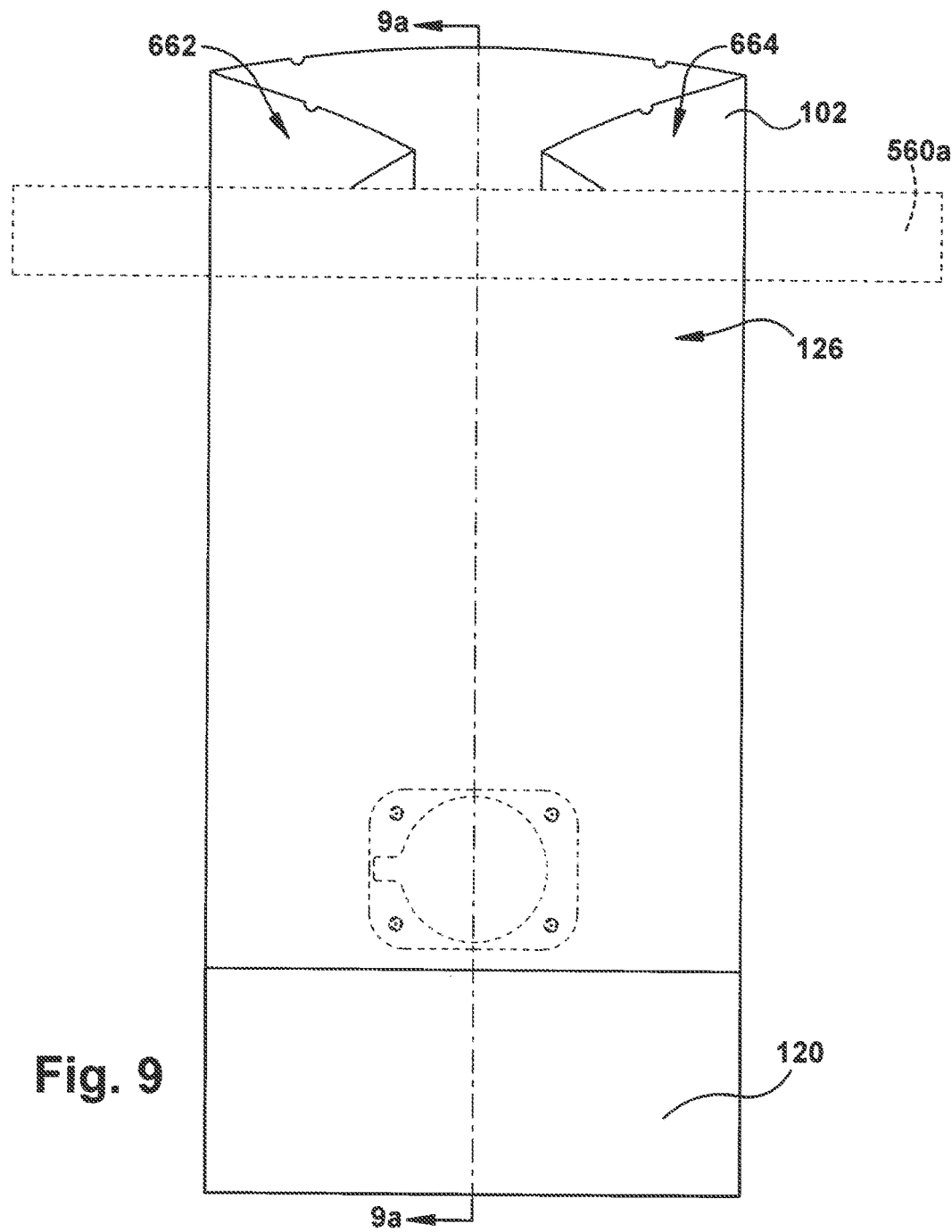
Figure 9A:
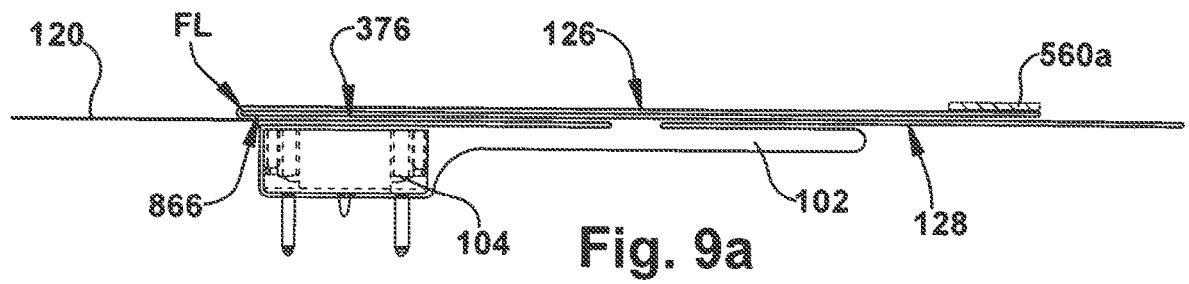
Figure 10:
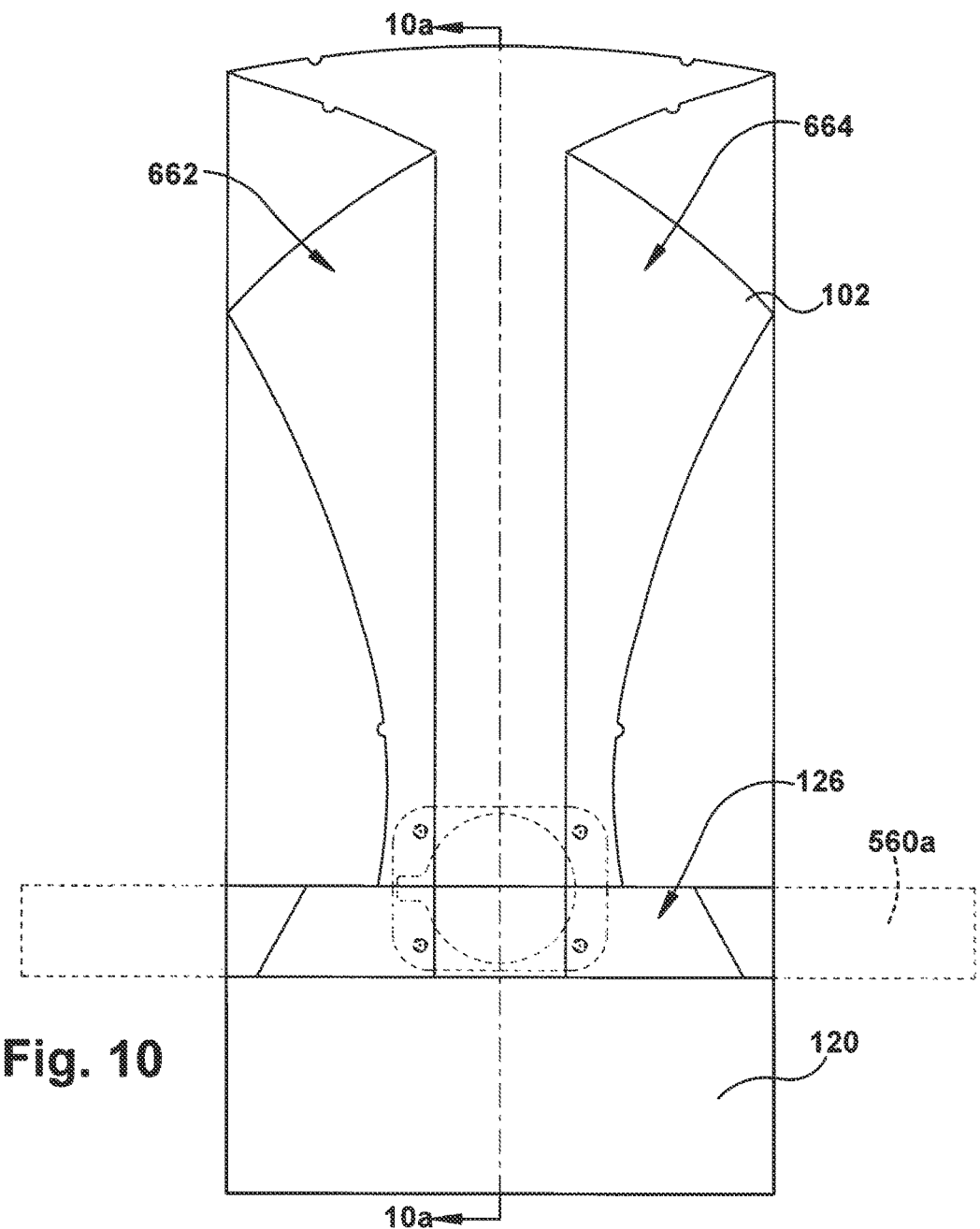
Figure 10A:
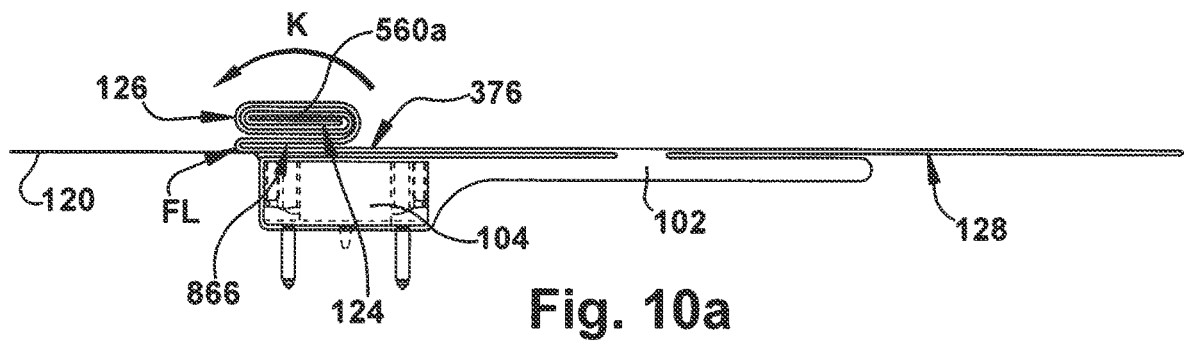

Referring to FIGS. 8-8a, with the lateral portions 662, 664 folded, the lower portion 126 is flip-folded, i.e. flipped or folded as indicated by an arrow identified at "J" in FIG. 8a about a fold line indicated generally at "FL", upward onto the central and upper portions 376, 128 of the airbag 102. This defines a flip-folded portion 866 of the lower portion 126. Referring to FIG. 9-10a, the upward folded lower portion 126 of the airbag 102 is then roll-folded downward, as indicated by the arrow identified at "K" in FIG. 10a, toward the fold line FL. This creates the rolled lower portion 124 of the airbag 102. As shown in 9-10a, a paddle 560 (shown here as paddle 560a) can be used to help roll-fold the upward folded lower portion 126 downward.

Figure 11:
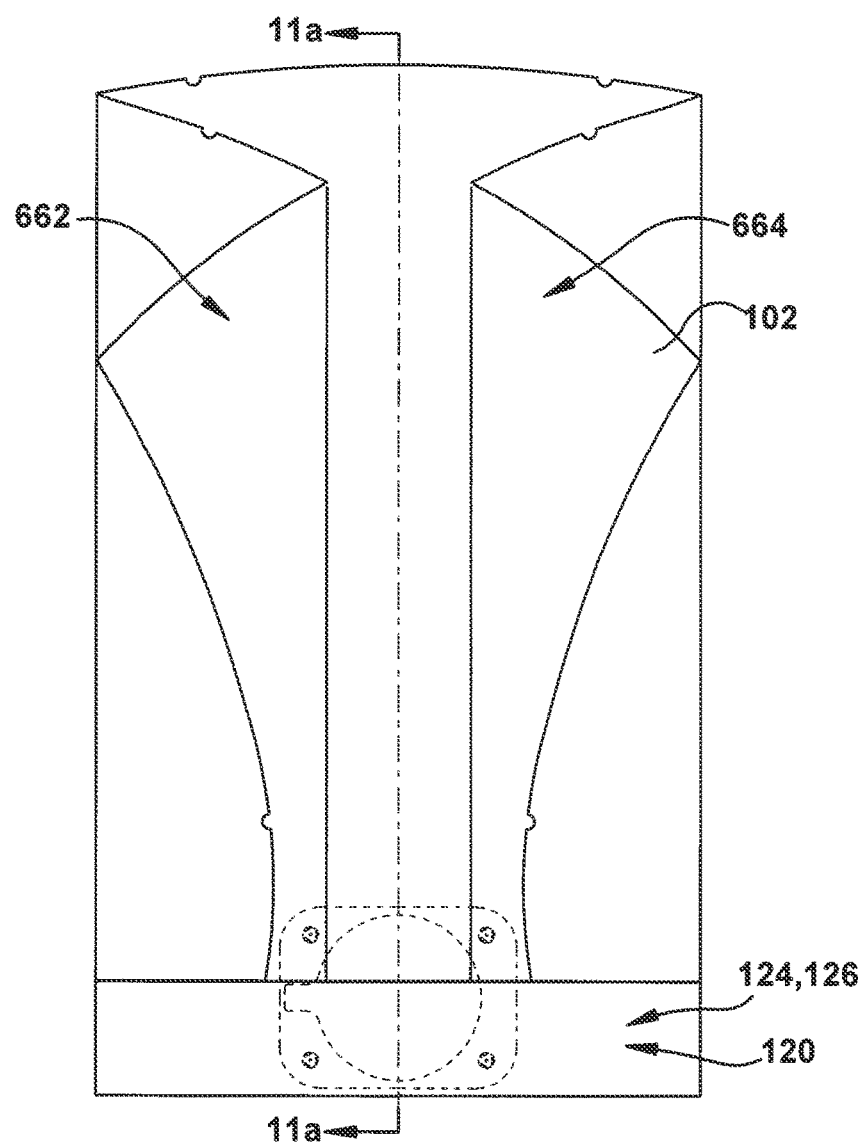
Figure 11A:
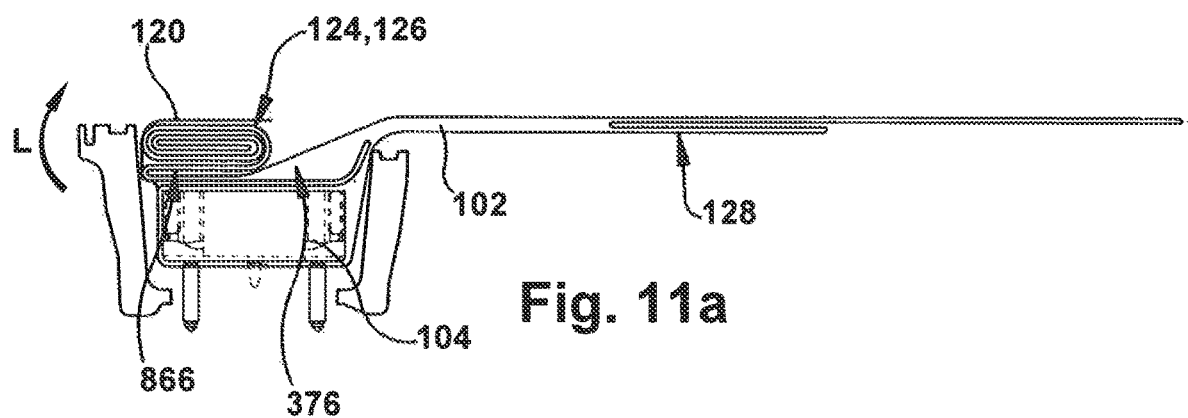

As shown in FIG. 10a, the rolled lower portion 124 is positioned adjacent and overlying the flip-folded portion 866. As shown in FIGS. 11-11a, if the paddle 560a was used to help roll-fold the rolled lower portion 124 of the airbag 102, the paddle 560a can be removed. Further, as shown in FIGS. 11-11a, the first deployment flap 120 is then positioned on the rolled lower portion 124 of the airbag 102, as indicated by an arrow identified at "L" in FIG. 11a, so that the first deployment flap 120 at least partially surrounds the flip-folded portion 866 of the lower portion 126 of the airbag 102 and the rolled lower portion 124 of the airbag 102.

Figure 12:
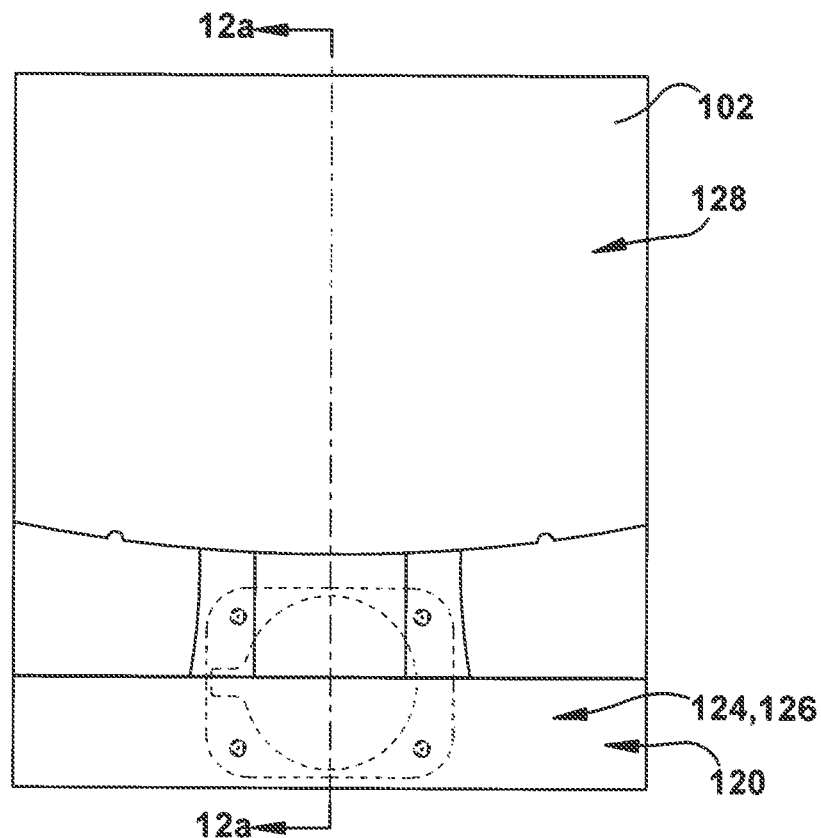
Figure 12A:
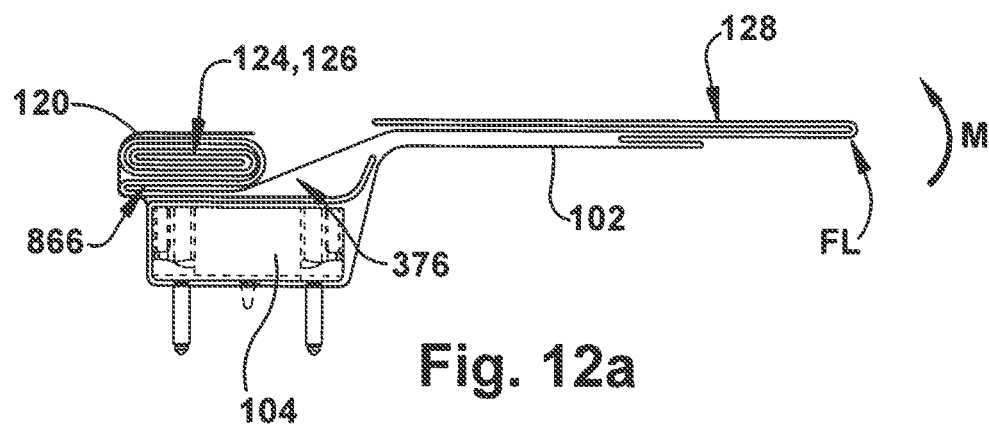
Figure 13:
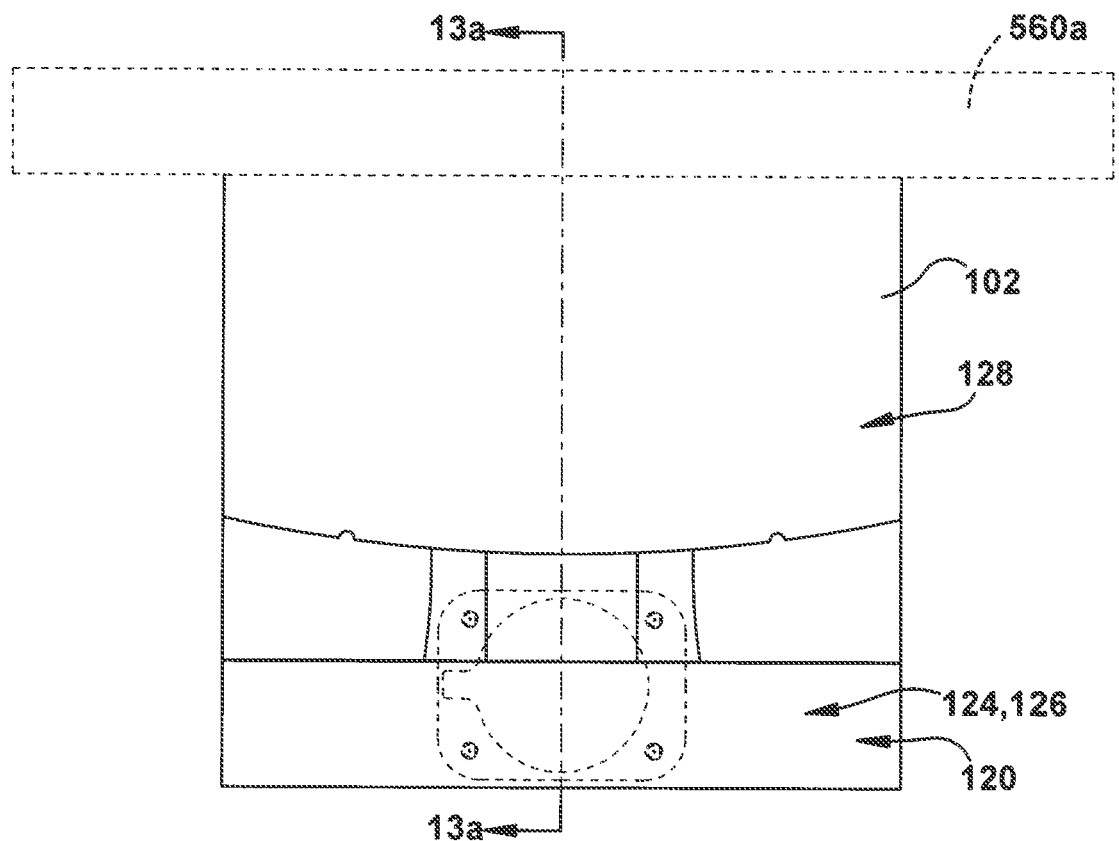
Figure 13A:
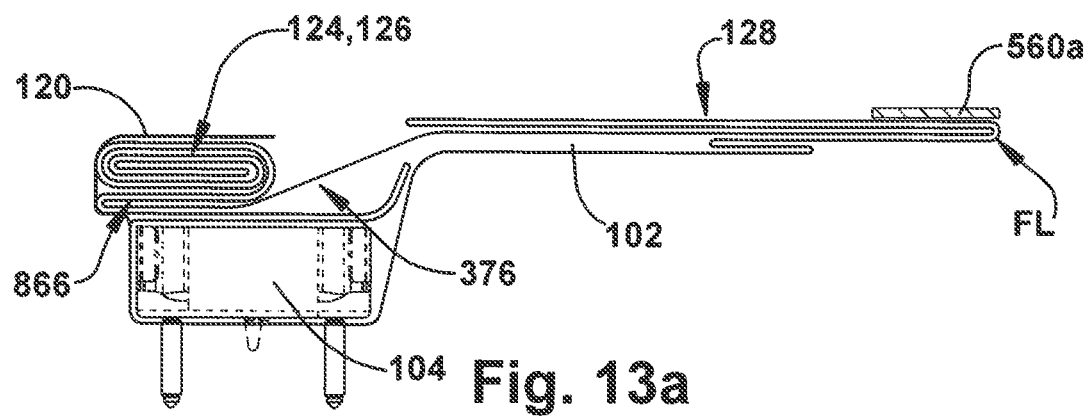
Figure 14:
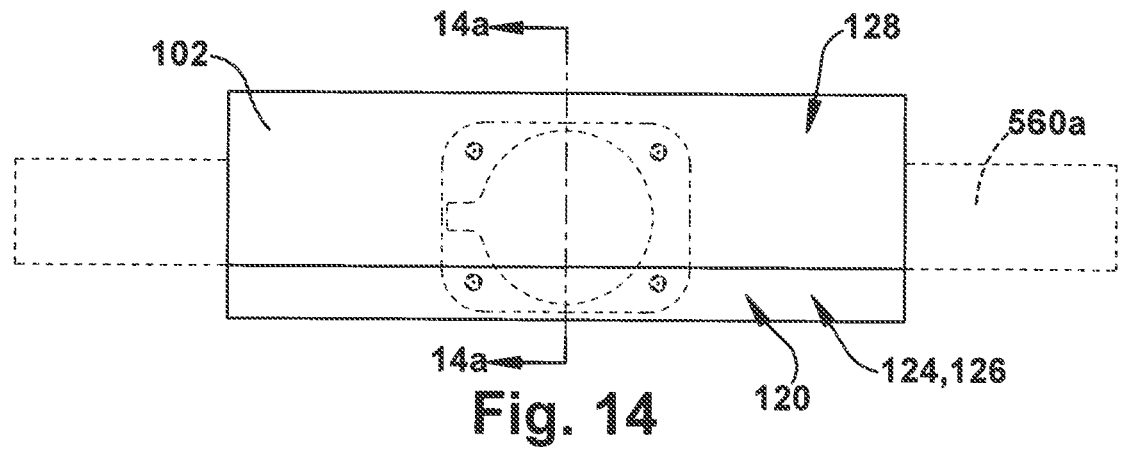
Figure 14A:
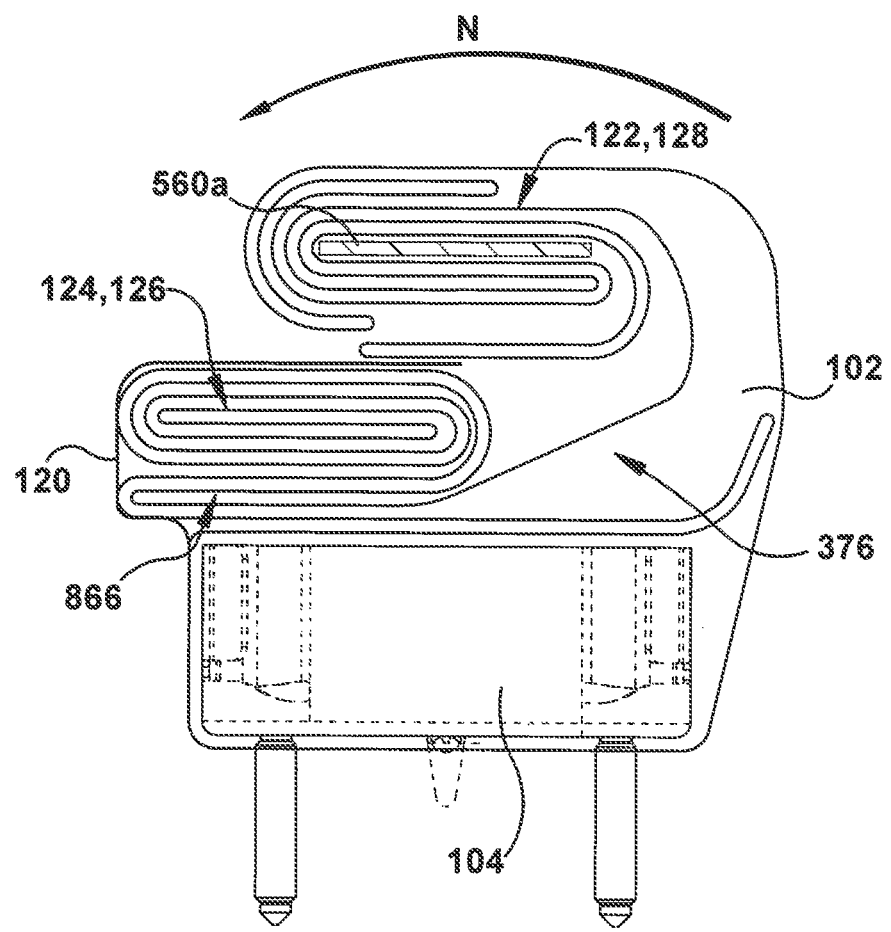

Referring to FIGS. 12-12a, the upper portion 128 is then flip-folded, i.e. flipped or folded as indicated by an arrow identified at "M" in FIG. 12a about a fold line indicated generally at "FL", downward onto itself. Referring to FIGS. 13-14a, the downward folded upper portion 128 of the airbag 102 is then roll-folded downward, as indicated by an arrow identified at "N" in FIG. 14a, toward the central and lower portions 376, 126. This creates the rolled upper portion 122 of the airbag 102. As shown in FIGS. 13-14a, a paddle 560 (shown here as paddle 560a) can be used to help roll-fold the downward folded upper portion 128 of the airbag 102 downward. As shown in FIGS. 14-14a, the rolled upper portion 122 is disposed adjacent and overlying the rolled lower portion 124 and at least a portion of the first deployment flap 120, so that the first deployment flap 120 is positioned between the rolled upper and lower portions 122, 124. If the paddle 560a was used to help roll-fold the rolled upper portion 122 of the airbag 102, the paddle 560a can be removed.

The upper portion 128 and the lower portion 126 are thus packaged separately in the stored condition of FIGS. 14-14a. By "packaged separately," it is meant that the upper portion 128 and the lower portion 126 are rolled, folded, or otherwise placed in the stored condition as separate and distinct portions of the airbag 102. This allows the first deployment flap 120 to at least partially surround the lower portion 126 without affecting the upper portion 128.

Figure 15:
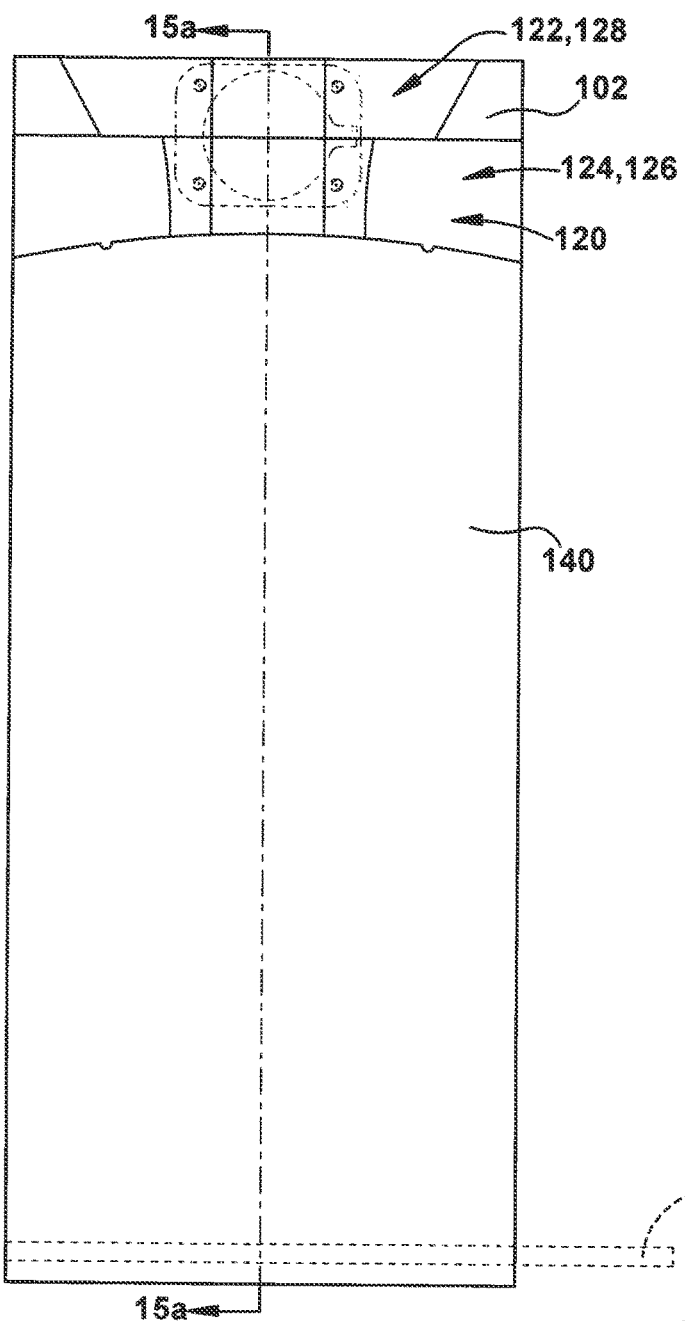
Figure 15A:
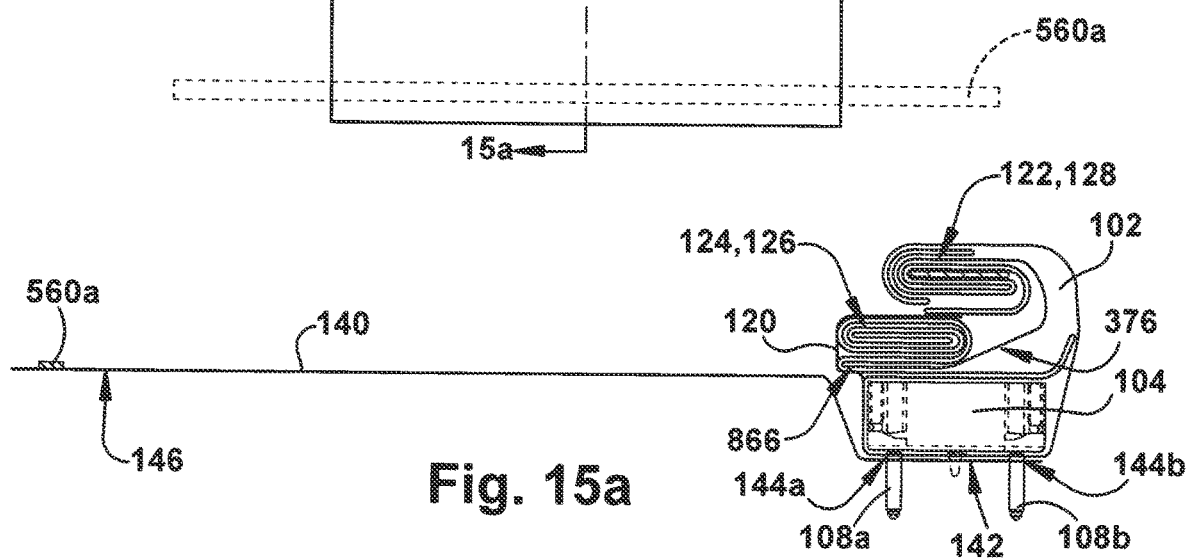

Referring to FIGS. 15-15a, with the rolled upper portion 122 disposed overlying the rolled lower portion 124 and at least a portion of the first deployment flap 120, the first end 142 of the second deployment flap 140 is attached to the vehicle V through the fasteners 108a, 108b so that the second end 146 of the second deployment flap 140 extends downward from the retainer 104, the inflator 112, and/or the fasteners 108a, 108b. For example, the fasteners 108a, 108b are passed through the aligned apertures 144a, 144b of the second deployment flap 140 to attach the second deployment flap 140 to the vehicle V. The first end 142 of the second deployment flap 140 is thus secured to the vehicle V and/or a structure in the vehicle V, such as the retainer 104, the inflator 112, the airbag module 110, or a combination thereof, via the fasteners 108a, 108b.

Figure 16:
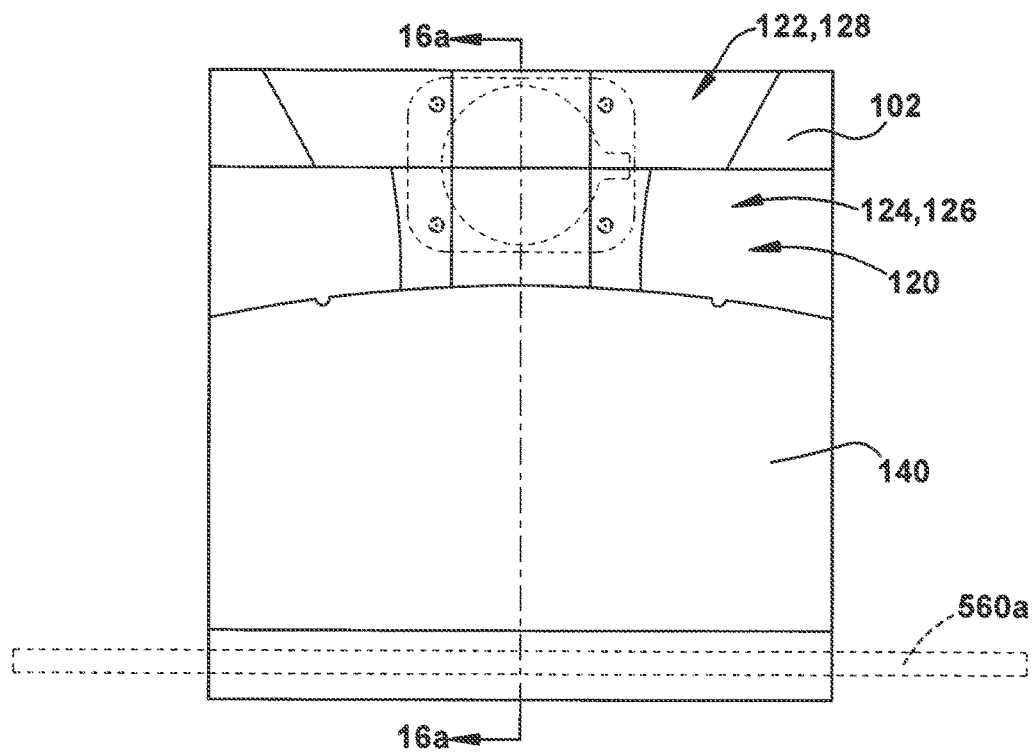
Figure 16A:
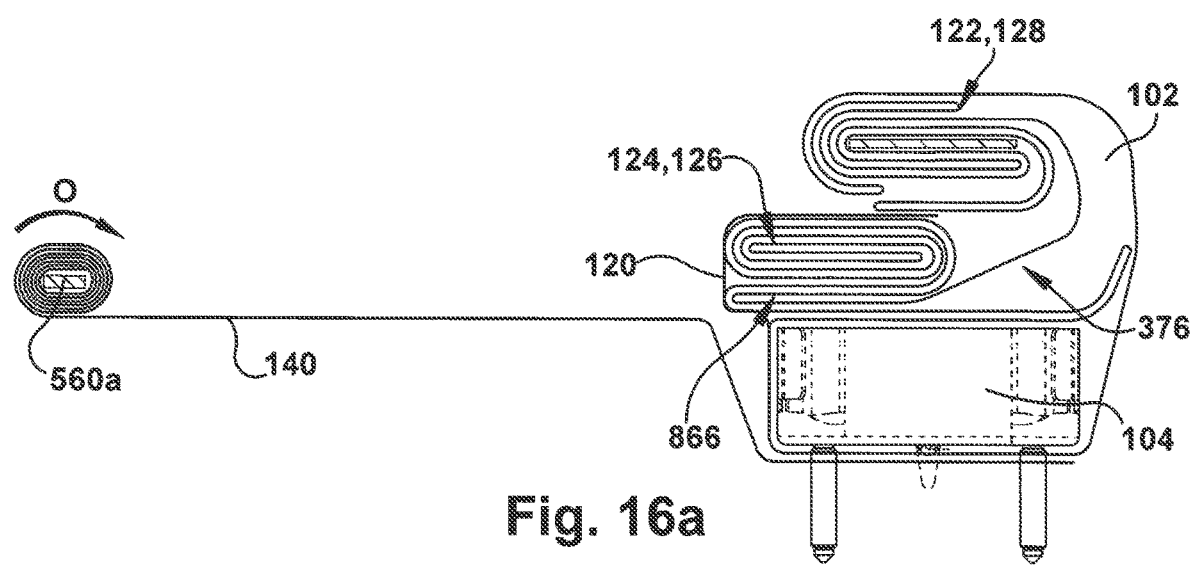
Figure 17:
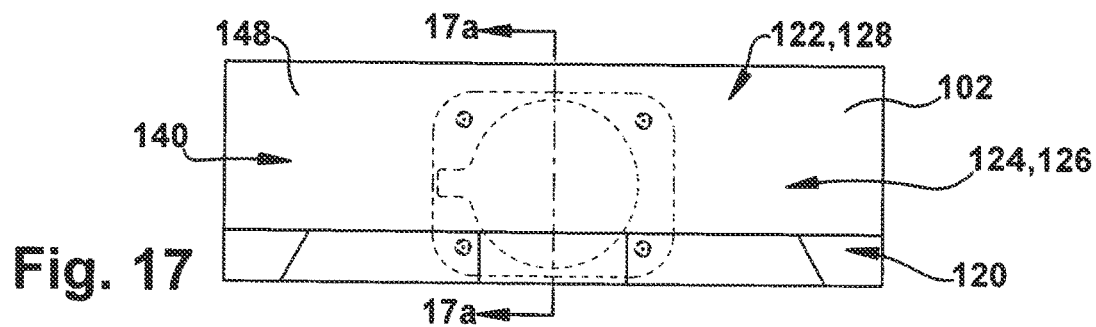
Figure 17A:
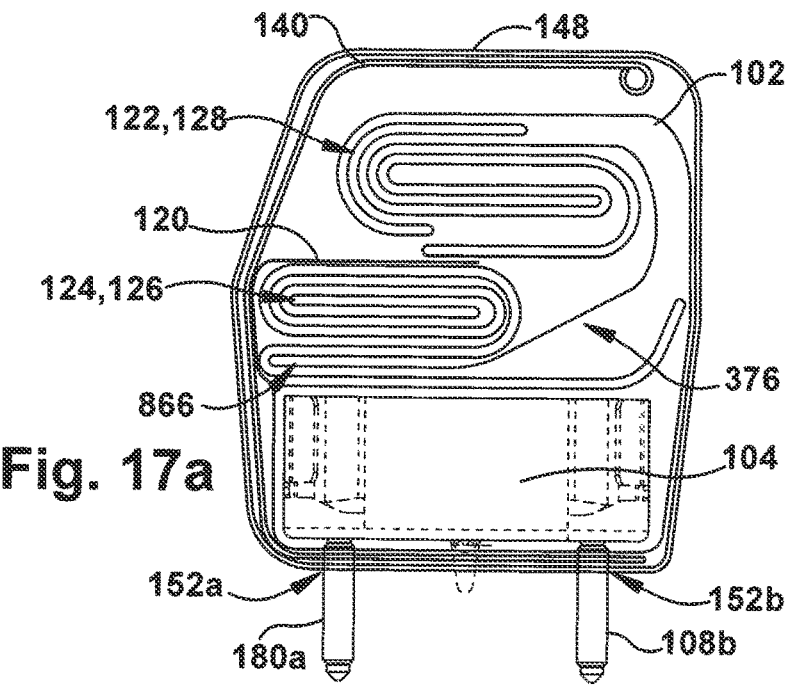

Referring to FIGS. 16-16a, the second deployment flap 140 is then roll-folded upward, as indicated by an arrow identified at "O" in FIG. 16a, toward the retainer 104, the inflator 112, and/or the fasteners 108a, 108b. As shown in FIGS. 16-16a, a paddle 560 (shown here as paddle 560a) can be used to help roll-fold the second deployment flap 140 upward. As shown in FIGS. 17-17a, at least a portion of the rolled second deployment flap 140 is disposed on the rolled upper portion 122 of the airbag 102, such that the second deployment flap 140 at least partially surrounds the rolled upper and lower portions 122, 124 of the airbag 102. The cover wrap 148 can then be placed around the airbag 102, the first deployment flap 120, the retainer 104, when the retainer 104 is provided, and the second deployment flap 140 to at least partially contain the airbag 102, the first deployment flap 120, the retainer 104, when the retainer 104 is provided, and the second deployment flap 140 in the stored condition. For example, the fasteners 108a, 108b are passed through the aligned apertures 152a, 152b of the cover wrap 148 to attach the cover wrap 148 to the vehicle V.

Figure 18:
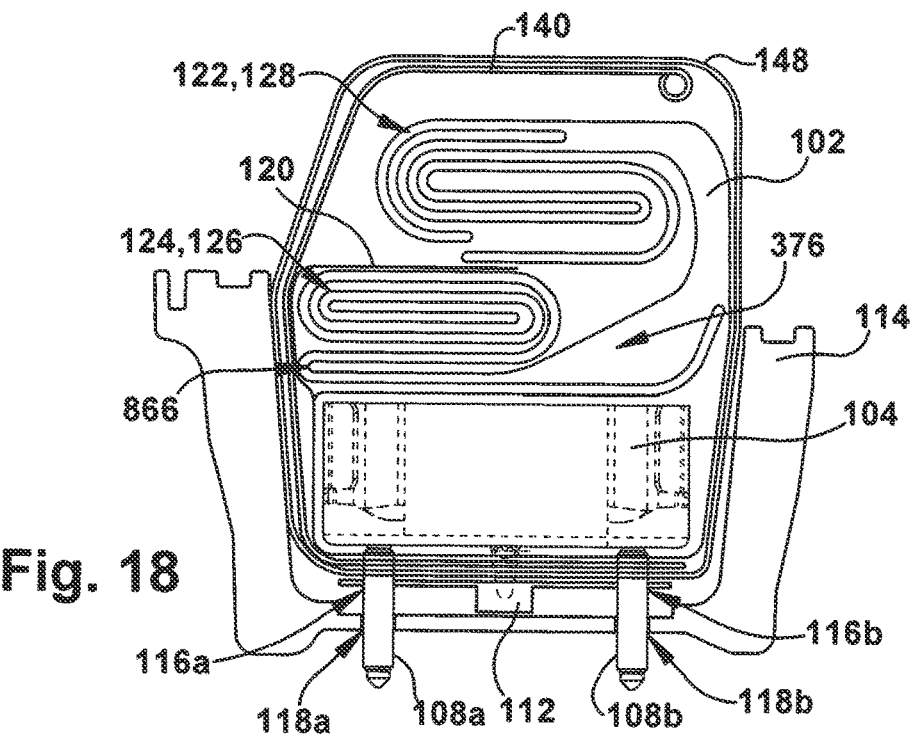

As shown in FIG. 18, the inflator 112, when the fasteners 108a, 108b are a part of the retainer 104, and the housing 114 can then be attached to the retainer 104. For example, the fasteners 108a, 108b are passed through the aligned apertures 116a, 116b, 118a, 118b of the inflator 112 and the housing 114 to attach the inflator 112 and the housing 114 to the retainer 104. The inflator 112 is placed into operative engagement with the airbag 102. The folded airbag 102, the retainer 104, the first deployment flap 120, the second deployment flap 140, and the inflator 112 can be positioned within the housing 114 so that the folded airbag 102, the retainer 104, the first deployment flap 120, the second deployment flap 140, and the inflator 112 are supported in the housing 114. Although the airbag 102 has been described as being completely folded into the stored condition and then placed in operative engagement with the inflator 112 and within the housing 114, one having ordinary skill in the art would understand that the airbag 102 can be placed in operative engagement with the inflator 112 and/or positioned within the housing 114 prior to, or while the airbag 102 is folded in the sequence as described above.

The airbag 102 can be heated and compressed during folding to maintain the upper and lower portions 128, 126 in the illustrated folded configuration of the Figures. Due to space, the airbag 102 and the first and second deployment flaps 120, 140 can be compressed or otherwise compacted so as to fit in an allotted space. The material of the airbag 102 and the first and second deployment flaps 120, 140 can be pressed tightly against one another, i.e., the spacing in the Figures is for illustration only.

From the above description of the invention, those skilled in the art will perceive improvements, changes and modifications. For example, although the present invention has been described and illustrated in a passenger frontal airbag implementation, those skilled in the art will appreciate that the present invention may have other alternative implementations, such as a driver frontal airbag implementation. Such improvements, changes and modifications within the skill of the art are intended to be covered by the appended claims.

Having described the invention, the following is claimed:

1. An apparatus for helping to protect an occupant of a vehicle, comprising:
   an airbag having a stored condition and being inflatable to a deployed condition;
   an inflator operatively connected to the airbag;
   fasteners connecting the airbag and the inflator to the vehicle;
   a first deployment flap connected to the vehicle through the fasteners;
   wherein the airbag comprises an upper portion and a lower portion and, in the stored condition of the airbag:
   the lower portion is rolled and/or folded and positioned at least partially overlying the inflator,
   the upper portion is rolled and/or folded separately from the lower portion and positioned at least partially overlying the lower portion, and
   the first deployment flap extends from the fasteners and has a portion positioned between the upper and lower portions of the airbag; and
   wherein the first deployment flap is at least one of formed from and coated with a material that provides a frictional engagement between the first deployment flap and the lower portion sufficient to at least partially restrict and delay the initial deployment of the lower portion; and
   wherein the roll and/or fold of the upper portion and the roll and/or fold of the lower portion are configured such that the upper and lower portions deploy initially toward each other and toward the portion of the first deployment flap positioned between upper and lower portions, the upper and lower portions exerting a force on the first deployment flap, which increases the frictional engagement between the first deployment flap and the lower portion, thereby increasing the degree to which the first deployment flap restricts and delays the initial deployment of the lower portion.

2. The apparatus of claim 1, wherein the first deployment flap is at least partially formed from high-density polyethylene.

3. The apparatus of claim 1, wherein the first deployment flap has a first surface and a second surface, the first surface of the first deployment flap contacting at least a portion of the lower portion when the first deployment flap is positioned between the upper and lower portions, the second surface of the first deployment flap contacting at least a portion of the upper portion when the first deployment flap is positioned between the upper and lower portions.

4. The apparatus of claim 3, wherein the frictional engagement between the lower portion and the first surface of the deployment flap is greater than frictional engagement between the upper portion and the second surface of the deployment flap.

5. The apparatus of claim 1, wherein the first deployment flap at least partially surrounds the lower portion of the airbag when the airbag is in the stored condition so as to at least partially restrict and delay initial deployment of the lower portion.

6. The apparatus of claim 5, wherein during deployment of the airbag, as a result of the first deployment flap restricting and delaying the initial deployment of the lower portion, the upper portion deploys in advance of the lower portion.

7. The apparatus of claim 5, wherein the restriction and delay of the initial deployment of the lower portion while the upper portion deploys causes the upper portion to be deployed at about a 45 degree angle from a vehicle floor.

8. The apparatus of claim 1, wherein the first deployment flap has a first end portion attached to the fasteners and a second terminal end portion positioned between the upper and lower portions of the airbag when the airbag is in the stored condition.

9. The apparatus of claim 1, further comprising a second deployment flap that at least partially surrounds the upper and lower portions of the airbag when the airbag is in the stored condition.

10. The apparatus of claim 9, wherein the second deployment flap has a first end and a second end, the first end of the second deployment flap being attached to the fasteners, at least a portion of the second deployment flap adjacent to the second end being positioned on the upper portion of the airbag when the airbag is in the stored condition.

11. The apparatus of claim 1, further comprising a housing and the inflator, wherein the airbag, the first deployment flap, and the inflator are supported in the housing, and wherein the inflator is operatively connected to the airbag.

12. The apparatus of claim 1, wherein the airbag is a passenger frontal airbag.

13. An airbag module comprising the apparatus of claim 1.

14. A vehicle safety system comprising the airbag module of claim 13.

15. A method for folding an airbag for helping to protect an occupant of a vehicle, comprising:
providing fasteners;
coupling the airbag to the fasteners;
flatly spreading the airbag;
folding first and second lateral portions of the airbag inward toward a central longitudinal axis of the airbag;
with the lateral portions folded, rolling the lower portion of the airbag downward to form a rolled lower portion of the airbag;
providing a first deployment flap;
coupling the first deployment flap to the fasteners;
positioning the first deployment flap on the rolled lower portion of the airbag;
rolling the upper portion of the airbag downward to form a rolled upper portion of the airbag; and
disposing the rolled upper portion overlying the rolled lower portion and at least a portion of the first deployment flap, the first deployment flap being positioned between the rolled upper and lower portions.

16. The method of claim 15, wherein:
rolling the lower portion of the airbag comprises folding the lower portion of the airbag upward onto an upper portion of the airbag and rolling the upward folded lower portion to form the rolled lower portion of the airbag; and
rolling the upper portion of the airbag comprises folding a portion of the upper portion of the airbag downward onto itself and rolling the downward folded upper portion of the airbag downward to form the rolled upper portion of the airbag.

17. The method of claim 15, further comprising:
with the rolled upper portion disposed overlying the rolled lower portion and at least a portion of the first deployment flap, attaching a first end of a second deployment flap to the fasteners so that a second end of the second deployment flap extends downward from the fasteners;
rolling the second deployment flap upward toward the fasteners; and
disposing at least a portion of the rolled second deployment flap on the rolled upper portion of the airbag, such that the second deployment flap at least partially surrounds the rolled upper and lower portions of the airbag.

18. The method of claim 17, further comprising placing a cover wrap around the airbag, the first deployment flap, and the second deployment flap to at least partially contain the airbag, the first deployment flap, and the second deployment flap in a stored condition, the cover wrap having at least one tear line.

19. The method of claim 15, wherein the first deployment flap is at least one of formed from and coated with a material that provides a frictional engagement between the first deployment flap and the rolled lower portion when the first deployment flap is positioned on the rolled lower portion of the airbag.

* * * * *